United States Patent
Peng et al.

(10) Patent No.: US 11,762,187 B2
(45) Date of Patent: *Sep. 19, 2023

(54) REFLECTIVE EYEPIECE OPTICAL SYSTEM AND HEAD-MOUNTED NEAR-TO-EYE DISPLAY DEVICE

(71) Applicant: Shenzhen NED Optics Co., Ltd, Shenzhen (CN)

(72) Inventors: Huajun Peng, Shenzhen (CN); Hongpeng Cao, Shenzhen (CN); Jianfei Guo, Shenzhen (CN)

(73) Assignee: Shenzhen NED Optics Co., Ltd, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/879,230

(22) Filed: Aug. 2, 2022

(65) Prior Publication Data

US 2023/0042416 A1 Feb. 9, 2023

(30) Foreign Application Priority Data

Aug. 2, 2021 (CN) .......................... 202110879521.9

(51) Int. Cl.
*G02B 15/14* (2006.01)
*G02B 17/08* (2006.01)
(Continued)

(52) U.S. Cl.
CPC ......... *G02B 25/001* (2013.01); *G02B 13/007* (2013.01); *G02B 13/0045* (2013.01); *G02B 15/144105* (2019.08); *G02B 15/144113* (2019.08); *G02B 17/0896* (2013.01); *G02B 27/0172* (2013.01); *G02B 2027/013* (2013.01);
(Continued)

(58) Field of Classification Search
CPC ........ G02B 27/0172; G02B 2027/0123; G02B 2027/0127; G02B 2027/013; G02B 17/08–0896; G02B 25/001
See application file for complete search history.

(56) References Cited

U.S. PATENT DOCUMENTS 5,646,783 A * 7/1997 Banbury ............ G02B 27/0176
359/630
6,646,811 B2 * 11/2003 Inoguchi .............. G02B 27/144
359/639

(Continued)

FOREIGN PATENT DOCUMENTS

CN 111965824 A * 11/2020 ......... G02B 27/0172
WO WO-2021042891 A1 * 3/2021

*Primary Examiner* — Nicholas R. Pasko
(74) *Attorney, Agent, or Firm* — Nitin Kaushik

(57) ABSTRACT

The present invention relates to a reflective eyepiece optical system and a head-mounted near-to-eye display device. The system includes: a first optical element and a second optical element arranged successively in an incident direction of an optical axis of human eyes, and a first lens group located on an optical axis of a miniature image displayer. The first optical element is used for transmitting and reflecting an image light from the miniature image displayer. The second optical element includes an optical reflection surface. The first optical element reflects the image light refracted by the first lens group to the second optical element, and then transmits the image light reflected by the second optical element to the human eyes.

20 Claims, 22 Drawing Sheets

(51) Int. Cl.
*G02B 27/01* (2006.01)
*G02B 25/00* (2006.01)
*G02B 13/00* (2006.01)

(52) U.S. Cl.
CPC ............... *G02B 2027/0123* (2013.01); *G02B 2027/0127* (2013.01)

(56) References Cited

U.S. PATENT DOCUMENTS

| | | | |
|---|---|---|---|
| 10,394,036 B2 * | 8/2019 | Hua | H04N 13/344 |
| 11,480,782 B1 * | 10/2022 | Peng | G02B 17/08 |
| 2006/0119951 A1 * | 6/2006 | McGuire | G02B 27/1026 359/630 |
| 2015/0192775 A1 * | 7/2015 | Suzuki | G02B 27/0101 359/630 |
| 2016/0320619 A1 * | 11/2016 | Watanabe | G02B 3/06 |
| 2017/0075096 A1 * | 3/2017 | Shi | G02B 17/08 |

* cited by examiner

REFLECTIVE EYEPIECE OPTICAL SYSTEM AND HEAD-MOUNTED NEAR-TO-EYE DISPLAY DEVICE

CROSS-REFERENCE TO RELATED APPLICATIONS

The application claims priority to Chinese patent application No. 202110879521.9, filed on Aug. 2, 2021, the entire contents of which are incorporated herein by reference.

TECHNICAL FIELD

The present invention relates to the field of optical technology, and more particularly, to a reflective eyepiece optical system and a head-mounted near-to-eye display device.

BACKGROUND

With the development of electronic devices to ultra-miniaturization, head-mounted display devices and products are constantly emerging in military, industrial, medical, educational, consumption and other fields, and in a typical wearable computing architecture, a head-mounted display device is a key component. The head-mounted display device directs the video image light emitted from a miniature image displayer (e.g., a transmissive or reflective liquid crystal displayer, an organic electroluminescent element, or a DMD device) to the pupil of a user by optical technology to implement virtual magnified images in the near-eye range of the user, so as to provide the user with intuitive and visual images, video, and text information. The eyepiece optical system is the core of the head-mounted display device, which realizes the function of displaying a miniature image in front of human eyes to form a virtual magnified image.

The head-mounted display device develops in the direction of compact size, light weight, convenient wearing, and load reduction. Meanwhile, a large field-of-view angle and visual comfort experience have gradually become key factors to evaluate the quality of the head-mounted display device. The large field-of-view angle determines a visual experience effect of high liveness, and high image quality and low distortion determine the comfort of visual experience. To meet these requirements, the eyepiece optical system should try its best to achieve such indexes as a large field-of-view angle, high image resolution, low distortion, small field curvature, and a small volume. It is a great challenge for system design and aberrations optimization to meet the above optical properties at the same time.

In Patent Document 1 (Chinese Patent Publication No. CN101915992A), Patent Document 2 (Chinese Patent Publication No. CN211698430U), Patent Document 3 (Chinese Patent Publication No. CN106662678A), and Patent Document 4 (Chinese Patent Publication No. CN105229514A), a reflective optical system utilizing a combination of conventional optical spherical surfaces and even-order aspherical surfaces is provided respectively, wherein Patent Document 1 adopts a relay scheme, but this scheme adopts a free-form surface reflection means, which greatly increases the difficulty of realizing the entire optical system; the optical systems in the Patent Document 2, Patent Document 3, and Patent Document 4 use reflective optical systems, but the basic optical structures vary greatly from one to another due to different application fields, such as in terms of a matching relationship between a lens face shape and a gap between the lenses.

Patent Document 5 (Chinese Patent Publication No. CN207081891U) and Patent Document 6 (Chinese Patent Publication No. CN108604007A) provide an eyepiece optical system that adopts a reflex means, which ensures high-quality imaging; however, its optical structure is often limited to single lens reflection, thereby greatly limiting a performance ratio of the entire optical structure.

To sum up, the existing optical structures not only have problems such as heavyweight, small field-of-view angle, and insufficient optical performance, but also have problems such as difficulty in processing and mass production due to the difficulty of implementation.

SUMMARY

The technical problem to be solved by the present invention is that the existing optical structure has the problems of heavy weight, low image quality, distortion, insufficient field-of-view angle, and difficulty in mass production. Aiming at the above defects of the prior art, a reflective eyepiece optical system and a head-mounted near-to-eye display device are provided.

The technical solutions adopted in the present invention to solve the technical problem thereof are as follows: constructing a reflective eyepiece optical system, including: a first optical element and a second optical element arranged successively in an incident direction of an optical axis of human eyes, and a first lens group located on an optical axis of a miniature image displayer, the first optical element is used for transmitting and reflecting an image light from the miniature image displayer; the second optical element includes an optical reflection surface, and the optical reflection surface is concave to the human eyes; the first optical element reflects the image light refracted by the first lens group to the second optical element, and then transmits the image light reflected by the second optical element to the human eyes;

an effective focal length of the eyepiece optical system is $f_w$, an effective focal length of the first lens group is $f_1$, an effective focal length of the second optical element is $f_2$, and $f_w$, $f_1$, and $f_2$ satisfy the following relations (1) and (2):

$$f_1/f_w < -0.47 \quad (1);$$

$$-2.53 < f_2/f_w < -0.64 \quad (2);$$

the first lens group includes a first sub-lens group, a second sub-lens group, a third sub-lens group, and a fourth sub-lens group arranged coaxially and successively along the optical axis direction from a human eye viewing side to the miniature image displayer side; effective focal lengths of the first sub-lens group, the second sub-lens group, and the third sub-lens group are a combination of positive, negative and positive; the effective focal length of the first sub-lens group is $f_{11}$, the effective focal length of the second sub-lens group is $f_{12}$, the effective focal length of the third sub-lens group is $f_{13}$, and $f_{11}$, $f_{12}$, $f_{13}$, and $f_1$ satisfy the following relations (3), (4), and (5):

$$0.19 < f_{11}/f_1 \quad (3);$$

$$f_{12}/f_1 < -0.019 \quad (4);$$

$$0.019 < f_{13}/f_3 \quad (5).$$

Further, a distance along the optical axis between the first optical element and the second optical element is $d_1$, a distance along the optical axis between the first optical element and the first lens group is $d_2$, and $d_1$ and $d_2$ satisfy the following relation (6):

$$0.82 < d_2/d_1 \qquad (6).$$

Further, a maximum effective optical aperture of the second optical element is $\varphi_2$, which satisfies the following relation (7):

$$\varphi_2 < 70 \text{ mm} \qquad (7).$$

Further, the effective focal length $f_{11}$ of the first sub-lens group, the effective focal length $f_{12}$ of the second sub-lens group, the effective focal length $f_{13}$ of the third sub-lens group, and the effective focal length $f_1$ of the first lens group further satisfy the following relations (8), (9), and (10):

$$0.78 < f_{11}/f_1 < 1.06 \qquad (8);$$

$$-1.16 < f_{12}/f_1 < -0.90 \qquad (9);$$

$$1.38 < f_{13}/f_1 < 3.6 \qquad (10).$$

Further, the first sub-lens group is composed of one lens; wherein, the first sub-lens group includes a first lens; and the first lens is a positive lens.

Further, the first sub-lens group is composed of two lenses, which are respectively a first lens distant from the miniature image displayer side and a second lens proximate to the miniature image displayer side; both the first lens and the second lens are positive lenses.

Further, an effective focal length of the first lens is $f_{111}$, and the effective focal length of the first sub-lens group is $f_{11}$, the $f_{111}$ and $f_{11}$ satisfy the following relation (11), $$0.10 < |f_{111}/f_{11}| \qquad (11).$$

Further, an optical surface of the first lens proximate to the human eye side is convex to the human eyes.

Further, the second sub-lens group is composed of one lens, wherein the second sub-lens group includes a third lens adjacent to the first sub-lens group; the third lens is a negative lens; an effective focal length of the third lens is $f_{121}$, and $f_{121}$ satisfies the following relation (12):

$$f_{121} < -5.38 \qquad (12).$$

Further, the third sub-lens group is composed of one lens, wherein the third sub-lens group includes a fourth lens adjacent to the second sub-lens group; the fourth lens is a positive lens; an effective focal length of the fourth lens is $f_{131}$, and $f_{131}$ satisfies the following relation (13):

$$8.82 < f_{131} \qquad (13).$$

Further, the fourth sub-lens group is composed of one lens, wherein the fourth sub-lens group includes a fifth lens adjacent to the third sub-lens group; an optical surface of the fifth lens proximate to the miniature image displayer side is concave to the miniature image displayer; an effective focal length of the fifth lens is $f_{141}$, and $f_{141}$ satisfies the following relation (14):

$$2.15 < |f_{141}/f_1| \qquad (14).$$

Further, the fifth lens and the miniature image displayer are movable together along the optical axis, for adjusting an equivalent visual virtual image distance of the eyepiece optical system.

Further, the first lens group includes one or more even-order aspherical face shapes; two optical surfaces of the fifth lens are both even-order aspherical face shapes; and two optical surfaces of the second optical element are both even-order aspherical face shapes.

Further, the even-order aspherical face shape satisfies the following relation (15):

$$z = \frac{cr^2}{1 + \sqrt{1 - (1+k)c^2 r^2}} + \alpha_2 r^2 + \alpha_4 r^4 + \alpha_6 r^6 + \ldots \qquad (15)$$

Further, the first optical element is a planar transflective optical element; a reflectivity of the first optical element is $Re_1$, and $Re_1$ satisfies the following relation (16):

$$20\% < Re_1 < 80\% \qquad (16).$$

Further, the second optical element includes two coaxial optical surfaces of the same face shape.

Further, a reflectivity of the optical reflection surface is $Re_2$, and $Re_2$ satisfies the following relation (17):

$$20\% < Re_2 \qquad (17).$$

Further, an angle of optical axis between the first lens group and the second optical element is $\lambda_1$, and $\lambda_1$ satisfies the following relation (18):

$$55° < \lambda_1 < 120° \qquad (18).$$

Further, the eyepiece optical system further includes a planar reflective optical element located between the first lens group and the first optical element; the planar reflective optical element reflects the image light refracted by the first lens group to the first optical element, the first optical element reflects the image light to the second optical element, and then transmits the image light reflected by the second optical element to the human eyes;

an included angle between the first lens group and the first optical element is $\lambda_2$, and $\lambda_2$ satisfies the following relation (19):

$$60° \leq \lambda_2 \leq 180° \qquad (19).$$

Further, the material of the second optical element is an optical plastic material.

The present application provides a head-mounted near-to-eye display device, including a miniature image displayer, and further including the reflective eyepiece optical system according to any one of the above items; wherein the eyepiece optical system is located between the human eyes and the miniature image displayer.

Further, the miniature image displayer is an organic electroluminescent device.

Further, the head-mounted near-to-eye display device includes two identical reflective eyepiece optical systems.

The present invention has following beneficial effects: the first optical element has transmission and reflection properties, the second optical element includes a reflection surface, the eyepiece optical system composed of the first lens group, the first optical element, and the second optical element is used for effectively folding the optical path, which reduces the overall size of the eyepiece optical system and improves the possibility of subsequent mass production. The first lens group includes a first sub-lens group, a second sub-lens group, a third sub-lens group, and a fourth sub-lens group. The first sub-lens group, the second sub-lens group, and the third sub-lens group adopt a focal length combination of positive, negative, and positive, and the focal length of the fourth sub-lens group may be positive or negative. On the basis of miniaturization, cost and weight reduction for the article, the aberrations of the optical system are greatly eliminated, and the basic optical indicators are also improved, ensuring high image quality and increasing the size of the picture angle. Therefore, an observer can watch large images of full frame, high definition and uniform image quality without any distortion and get visual experience of high liveness via the present invention, which is suitable for near-to-eye displays and similar devices thereof.

BRIEF DESCRIPTION OF THE DRAWINGS

In order to illustrate technical solutions of embodiments of the present invention or the prior art more clearly, the present invention will be further illustrated below with reference to accompanying drawings and embodiments. The accompanying drawings described below are merely some embodiments of the present invention, and for those of ordinary skill in the art, other accompanying drawings can be obtained according to these accompanying drawings without creative effort:

Figure 10:
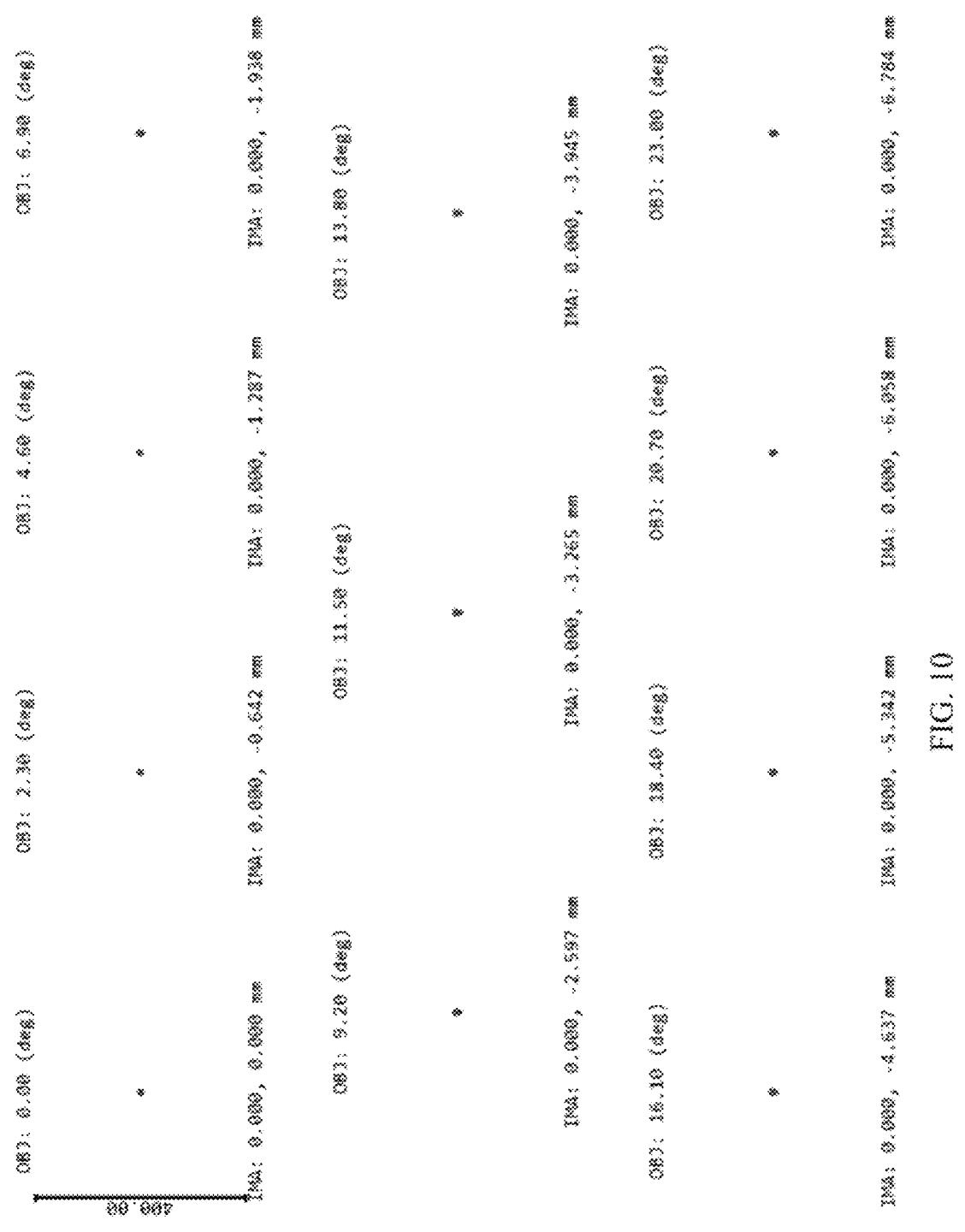

FIG. 10 is a schematic spot diagram of the reflective eyepiece optical system according to the third embodiment of the present invention;

Figure 14:
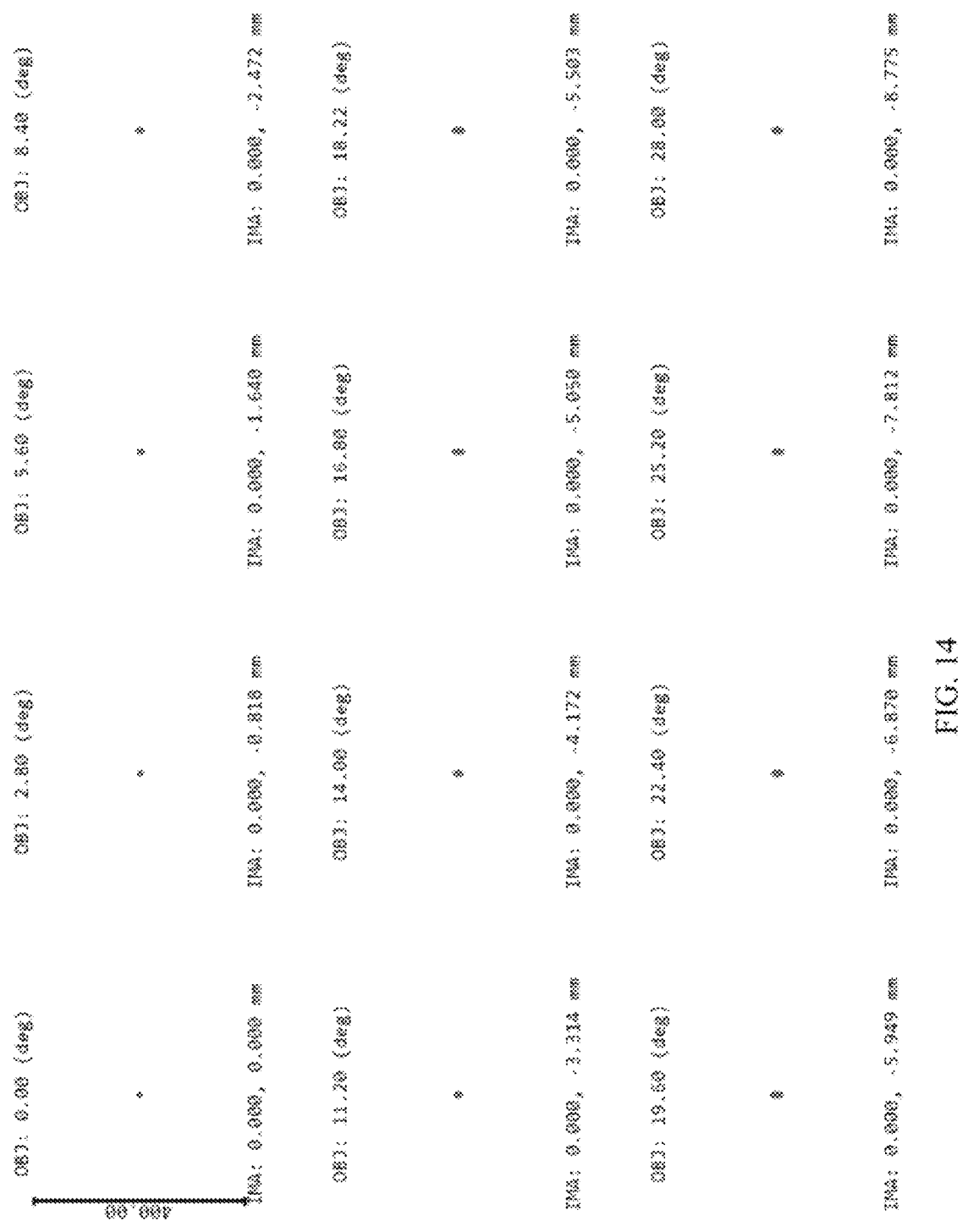

FIG. 14 is a schematic spot diagram of the reflective eyepiece optical system according to the fourth embodiment of the present invention;

DETAILED DESCRIPTION OF THE PREFERRED EMBODIMENT

Figure 1:
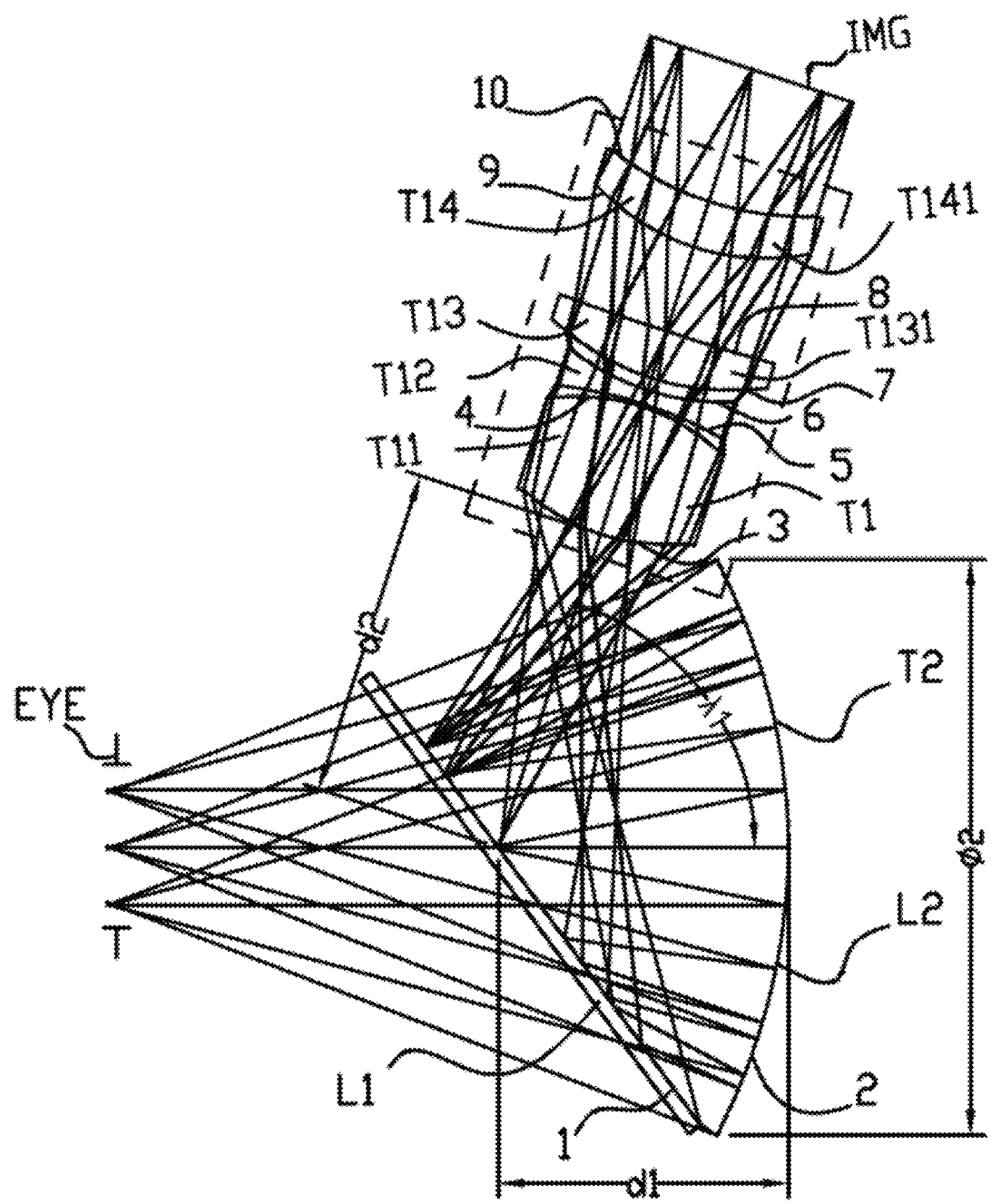
FIG. 1 is an optical path structural diagram of a reflective eyepiece optical system according to a first embodiment of the present invention.
Figure 2:
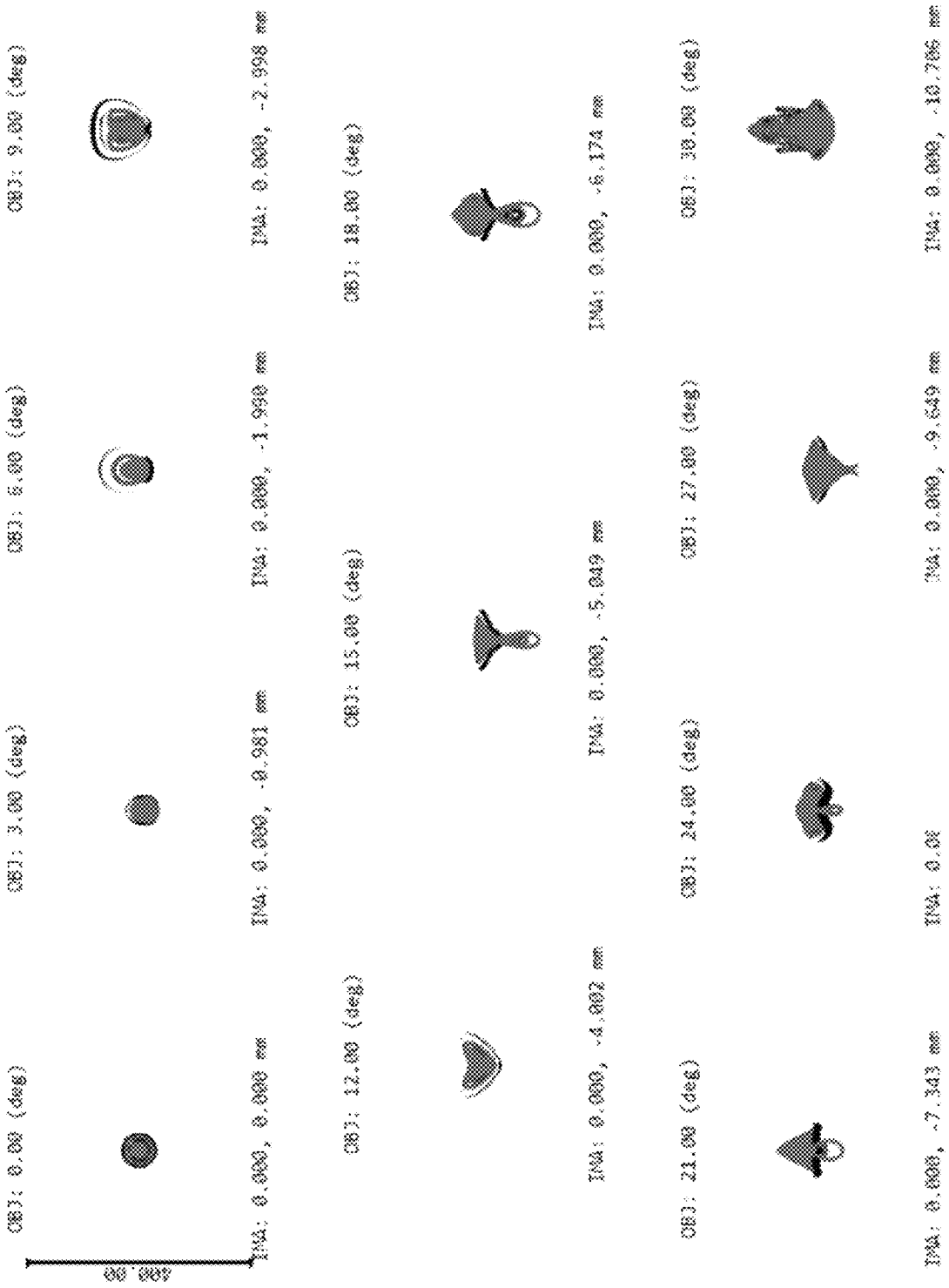
FIG. 2 is a schematic spot diagram of the reflective eyepiece optical system according to the first embodiment of the present invention.
Figure 3A:
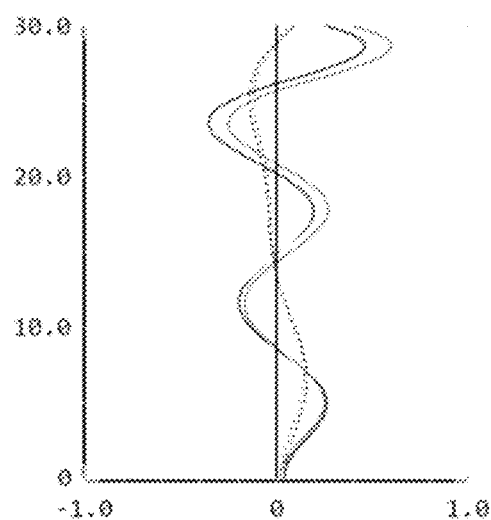
FIG. 3a is a schematic diagram of a field curvature of the reflective eyepiece optical system according to the first embodiment of the present invention.
Figure 3B:
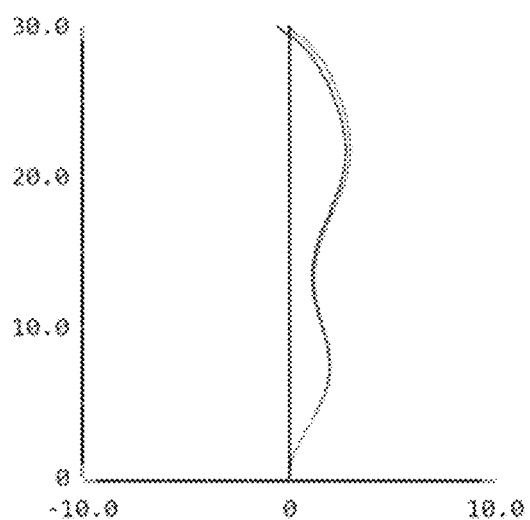
FIG. 3b is a schematic diagram of a distortion of the reflective eyepiece optical system according to the first embodiment of the present invention.
Figure 4:
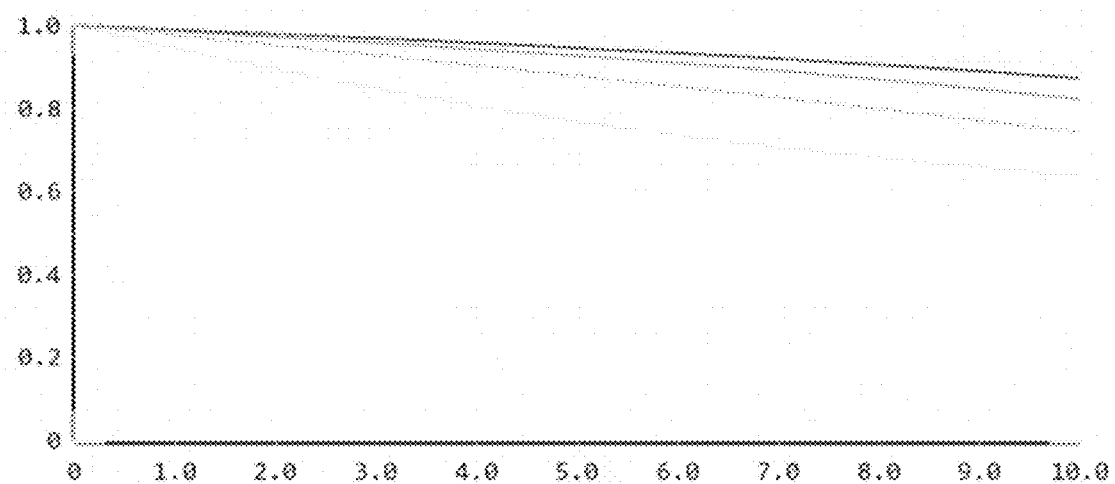
FIG. 4 is a plot of an optical modulation transfer function (MTF) of the reflective eyepiece optical system according to the first embodiment of the present invention.

In order to clarify the objects, technical solutions and advantages of the embodiments of the present invention, the following clear and complete description will be made for the technical solution in the embodiments of the present invention. Apparently, the described embodiments are just some rather than all embodiments of the present invention. All other embodiments obtained by one of ordinary skill in the art without any creative effort based on the embodiments disclosed in the present invention fall into the scope of the present invention.

The present invention constructs a reflective eyepiece optical system, including: a first optical element and a second optical element arranged successively in an incident direction of an optical axis of human eyes, and a first lens group located on an optical axis of a miniature image displayer; the first optical element is used for transmitting and reflecting an image light from the miniature image displayer, the second optical element includes an optical reflection surface, and the optical reflection surface is concave to a human eye viewing direction; the first optical element reflects the image light refracted by the first lens group to the second optical element, and then transmits the image light reflected by the second optical element to the human eyes.

An effective focal length of the eyepiece optical system is $f_w$, an effective focal length of the first lens group is $f_1$, an effective focal length of the second optical element is $f_2$, and $f_w$, $f_1$, and $f_2$ satisfy the following relations (1) and (2):

$$f_1/f_w < -0.47 \tag{1}$$

$$-2.53 < f_2/f_w < -0.64 \tag{2}$$

wherein, a value of $f_1/f_w$ may be −100.57, −56.55, −33.351, −21.131, −10.951, −7.935, −5.815, −3.615, −1.589, −0.47, etc., and a value of $f_2/f_w$ may be −2.53, −2.521, −2.13, −1.99, −1.55, −1.21, −1.02, −0.98, −0.875, −0.753, −0.659, −0.64, etc.

The first lens group includes a first sub-lens group, a second sub-lens group, a third sub-lens group, and a fourth sub-lens group arranged coaxially and successively along an optical axis from a human eye viewing side to the miniature image displayer side; effective focal lengths of the first sub-lens group, the second sub-lens group, and the third sub-lens group are a combination of positive, negative and positive; the effective focal length of the first sub-lens group is $f_{11}$, the effective focal length of the second sub-lens group is $f_{12}$, the effective focal length of the third sub-lens group is $f_{13}$, and $f_{11}$ $f_{12}$, $f_{13}$ and $f_1$ satisfy the following relations (3), (4), and (5):

$$0.19 < f_{11}/f_1 \tag{3};$$

$$f_{12}/f_1 < -0.019 \tag{4};$$

$$0.019 < f_{13}/f_1 \tag{5}.$$

wherein, a value of $f_{11}/f_1$ may be 0.19, 0.20, 0.39, 0.57, 0.77, 0.89, 1.35, 3.25, 5.56, 36.1, 54.1, 87.6, etc., a value of $f_{12}/f_1$ may be −120.43, −100.47, −77.55, −51.25, −45.33, −21.78, −15.13, −10.55, −7.15, −4.14, −0.13, −0.02, −0.019 etc., and a value of $f_{13}/f_1$ may be 0.019, 0.020, 0.139, 1.99, 5.83, 12.13, 22.54, 35.24, 43.55, 83.59, etc.

In the above relations (1), (2), (3), (4), and (5), the value ranges of $f_1/f_w$, $f_2/f_w$, $f_{11}/f_1$, $f_{12}/f_1$, and $f_{13}/f_1$ are closely related to sensitivities of a correction of system aberrations, a processing difficulty of optical members, and assembly deviations of the optical elements. The value of $f_1/f_w$ in the relation (1) is less than −0.47, which improves the processability of the optical elements in the system. The value of $f_2/f_w$ in the relation (2) is greater than −2.53, which improves the processability of the optical elements in the system, while its value is less than −0.64, so that the system aberrations can be fully corrected, thereby achieving higher quality optical effects. The value of $f_{11}/f_1$ in the relation (3) is greater than 0.19, so that the system aberrations can be fully corrected, thereby achieving high quality optical effects. The value of $f_{13}/f_1$ in the relation (5) is larger than 0.019, so that the system aberrations can be fully corrected, thereby achieving high quality optical effects. The value of $f_{12}/f_1$ in the relation (4) is less than −0.019, which reduces difficulty of spherical aberration correction and facilitates realization of a large optical aperture.

The first lens group includes four sub-lens groups, which are respectively a first sub-lens group, a second sub-lens group, a third sub-lens group, and a fourth sub-lens group arranged adjacently. The first sub-lens group, the second sub-lens group, and the third sub-lens group adopt a focal length combination of positive, negative, and positive, and the focal length of the fourth lens group may be a positive focal length or a negative focal length, wherein the negative lens group corrects aberrations, and the positive lens group provides focused imaging. The respective sub-lens groups adopt a focal length combination of "positive, negative, positive, and positive" or "positive, negative, positive, and negative," the combination of the sub-lens groups is relatively complex, which can further correct aberrations, and has better processability, thereby fully correcting the aberrations of the system, and improving the optical resolution of the system.

More importantly, with the transmission and reflection properties of the first optical element, the second optical element has a reflection surface to effectively fold the optical path, which reduces the overall size of the eyepiece optical system, and improves the possibility of subsequent mass production. On the basis of miniaturization, cost and weight reduction for the article, the aberrations of the optical system are greatly eliminated, and the basic optical indicators are also improved to ensure high imaging quality and increase the size of the picture angle. Therefore, an observer can watch large images of full frame, high definition and uniform image quality without any distortion and get visual experience of high liveness via the present invention, and the present article is suitable for head-mounted near-to-eye display devices and similar devices.

In the above embodiment, the first optical element may be a polarizer with 75% transmission and 25% reflection, or 65% transmission and 35% reflection, or a transflective function. The second optical element is a component only having a reflective function, which may be a lens or a metal piece with a reflective function.

As shown in FIG. 1, a first optical element, a second optical element, and a first lens group arranged along an optical axis from a human eye viewing side to a miniature image displayer are included. The optical surface closer to the eye E side is marked as 1, and by analogy (2, 3, 4, 5, 6 . . . respectively from left to right). The light emitted from the miniature image displayer is refracted by the first lens group, and then reflected on the first optical element to the second optical element. The light is reflected by the second optical element onto the first optical element, and then transmitted to the human eyes through the first optical element.

In a further embodiment, a distance along the optical axis between the first optical element and the second optical element is $d_1$, a distance along the optical axis between the first optical element and the first lens group is $d_2$, and $d_1$ and $d_2$ satisfy the following relation (6):

$$0.82 < d_2/d_1 \tag{6};$$

wherein, a value of $d_2/d_1$ may be 0.82, 0.83, 0.88, 0.98, 1.55, 2.37, 3.55, 3.88, 3.99, 4.57, 4.89, 4.99, etc.

A lower limit of $d_2/d_1$ in the above relation (6) is greater than 0.82, which reduces the difficulty of correcting an off-axis aberration of the system, and ensures that both a central field-of-view and an edge field-of-view achieve high image quality, so that the image quality in the full frame is uniform.

In a further embodiment, a maximum effective optical aperture of the second optical element is $\varphi_2$, which satisfies following relation (7):

$$\varphi_2 < 70 \text{ mm} \tag{7};$$

wherein, a value of $\varphi_2$ may be 70, 69, 65, 56, 52, 48, 32, 30, 28, 26, 21, etc., in mm.

In a further embodiment, the effective focal length $f_{11}$ of the first sub-lens group, the effective focal length $f_{12}$ of the second sub-lens group, the effective focal length $f_{13}$ of the third sub-lens group, and the effective focal length $f_1$ of the first lens group further satisfy the following relations (8), (9), and (10):

$$0.78 < f_{11}/f_1 < 1.06 \tag{8}$$

$$-1.16 < f_{12}/f_1 < -0.90 \tag{9}$$

$$1.38 < f_{13}/f_1 < 3.6 \tag{10}.$$

wherein, a value of $f_{11}/f_1$ may be 0.78, 0.79, 0.81, 0.83, 0.85, 0.895, 0.954, 1.0, 1.05, 1,06, etc., a value of $f_{12}/f_1$ may be −1.16, −1.15, −1.12, −1.10, −1.07, −1.06, −1.03, −1.01, −0.95, −0.91, −0.90, etc., and a value of $f_{13}/f_1$ may be 1.38 1.39, 1.963, 2.19, 2.345, 2.548, 2.854, 2.961, 3.54, 3.59, 3.6, etc.

By further optimizing the value ranges of the effective focal length of the first sub-lens group, the second sub-lens group, the third sub-lens group, and the system, the optical performance and difficulty of processing and manufacturing of the optical system are better balanced.

In one of the embodiments, the first sub-lens group is composed of one lens; the first sub-lens group includes a first lens; and the first lens is a positive lens.

In one of the embodiments, the first sub-lens group is composed of two lenses, respectively a first lens distant from the miniature image displayer side and a second lens proximate to the miniature image displayer side; both the first lens and the second lens are positive lenses.

In a further embodiment, an effective focal length of the first lens is $f_{111}$, the effective focal length of the first sub-lens group is $f_{11}$, and $f_{111}$ and $f_{11}$ satisfy the following relation (11):

$$0.10 < |f_{111}/f_{11}| \tag{1}$$

wherein, a value of $|f_{111}/f_{11}|$ may be 0.10, 0.11, 0.22, 0.58, 1.32, 1.55, 2.25, 3.57, 5.57, 8.79, 9.91, 10.11, 20.22, etc.

The value of $|f_{111}/f_{11}|$ in the relation (11) is greater than 0.10, so that the system aberrations can be fully corrected, thereby achieving high quality optical effects.

In a further embodiment, an optical surface of the first lens proximate to the human eye side is convex to the human eyes.

The above embodiment further eliminates system aberrations such as astigmatism and field curvature, which is beneficial to the high-resolution optical effect of the eyepiece system with uniform image quality across the full frame.

In a further embodiment, the second sub-lens group is composed of one lens, and the second sub-lens group includes a third lens adjacent to the first sub-lens group; the third lens is a negative lens; an effective focal length of the third lens is $f_{121}$, and $f_{121}$ satisfies the following relation (12):

$$f_{121} < -5.38 \tag{12}$$

wherein, a value of $f_{121}$ may be −5.38, −5.39, −6.72, −9.88, −21.32, −41.55, −52.25, −63.57, −75.57, −88.79, −99.91, −110.11, −220.22, etc. The value of $f_{121}$ in the relation (12) is less than −5.38, which reduces the difficulty of spherical aberrations correction and facilitates the realization of a large optical aperture.

In a further embodiment, the third sub-lens group is composed of one lens, and the third sub-lens group includes a fourth lens adjacent to the second sub-lens group; the fourth lens is a positive lens; an effective focal length of the fourth lens is $f_{131}$, and $f_{131}$ satisfies the following relation (13):

$$8.82 < f_{131} \tag{13}$$

wherein, a value of $f_{131}$ may be 8.82, 8.83, 9.72, 19.88, 21.32, 41.55, 52.25, 63.57, 75.57, 88.79, 99.91, 110.11, 220.22, etc. The value of $f_{131}$ in the relation (13) is greater than 8.82, so that the system aberrations can be fully corrected, thereby achieving high quality optical effects.

In a further embodiment, the fourth sub-lens group is composed of one lens, and the fourth sub-lens group includes a fifth lens adjacent to the third sub-lens group; an optical surface of the fifth lens proximate to the miniature image displayer side is concave to the miniature image displayer; an effective focal length of the fifth lens is $f_{141}$, and $f_{141}$ satisfies the following relation (14):

$$2.15 < |f_{141}/f_1| \tag{14}$$

wherein, a value of $|f_{141}/f_1|$ may be 2.15, 2.16, 5.25, 8.1, 14.14, 26.53, 48.78, 100, 225, etc. The value of $|f_{141}/f_1|$ in the relation (14) is greater than 2.15, so that the system aberrations can be fully corrected, thereby achieving high quality optical effects.

In a further embodiment, the fifth lens and the miniature image displayer are movable together along the optical axis, for adjusting an equivalent visual virtual image distance of the eyepiece optical system. By moving image plane positions of the fifth lens and the miniature image displayer along the optical axis at the same time, the equivalent visual virtual image distance of the eyepiece optical system may be adjusted.

In a further embodiment, the first lens group includes one or more even-order aspherical face shapes; two optical surfaces of the fifth lens are both even-order aspherical face shapes; and two optical surfaces of the second optical element are both even-order aspherical face shapes.

The aberrations at all levels of the optical system are further optimized and corrected. The optical performance of the eyepiece optical system is further improved.

In a further embodiment, the even-order aspherical face shape satisfies the following relation (15):

$$z = \frac{cr^2}{1 + \sqrt{1 - (1+k)c^2 r^2}} + \alpha_2 r^2 + \alpha_4 r^4 + \alpha_6 r^6 + \ldots \tag{15}$$

wherein, z is a vector height of the optical surface, c is a curvature at the aspherical vertex, k is an aspherical coefficient, and $\alpha 2, 4, 6 \ldots$ are coefficients of various orders, and r is a distance coordinate from a point on a surface to an optical axis of a lens system.

The aberrations of the optical system (including spherical aberration, coma, distortion, field curvature, astigmatism, chromatic aberration and other higher-order aberrations) are fully corrected, which is beneficial for the eyepiece optical system, while realizing a large angle of view and a large aperture, to further improve the image quality of the central field-of-view and the edge field-of-view, and reduce the image quality difference between the central field-of-view and the edge field-of-view, thereby achieving more uniform image quality and low distortion in the full frame.

In a further embodiment, the first optical element is a planar transflective optical element; a reflectivity of the first optical element is $Re_1$, and $Re_1$ satisfies the following relation (16):

$$20\% < Re_1 < 80\% \tag{16}$$

wherein, a value of $Re_1$ may be 20%, 21%, 30%, 47%, 52%, 60%, 65%, 70%, 79%, etc.

In a further embodiment, the second optical element includes two coaxial optical surfaces of the same face shape.

In a further embodiment, a reflectivity of the optical reflection surface is $Re_2$, and $Re_2$ satisfies the following relation (17):

$$20\% < Re_2 \tag{17}$$

wherein, a value of $Re_2$ may be 20%, 21%, 30%, 47%, 52%, 60%, 65%, 70%, 80%, 99%, etc.

In a further embodiment, an angle of optical axis between the first lens group and the second optical element is $\lambda_1$, and $\lambda_1$ satisfies the following relation (18):

$$55° < \lambda_1 < 120° \tag{18}$$

wherein, a value of $\lambda_1$ may be 55°, 60°, 66°, 70°, 90°, 100°, 115°, 120°, etc.

In one of the embodiments, the eyepiece optical system further includes a planar reflective optical element located between the first lens group and the first optical element; the planar reflective optical element reflects the image light refracted by the first lens group to the first optical element, the first optical element reflects the image light to the second optical element, and then transmits the image light reflected by the second optical element to the human eyes.

An included angle between the first lens group and the first optical element is $\lambda_2$, and $\lambda_2$ satisfies the following relation (19):

$$60° \leq \lambda_2 \leq 180° \quad (19);$$

wherein, a value of $\lambda_2$ may be 60°, 74°, 80°, 90°, 100°, 130°, 140°, 155°, 167°, 180°, etc.

In a further embodiment, the material of the second optical element is an optical plastic material, such as E48R, EP5000, and OKP1.

The aberrations at all levels of the eyepiece optical system are fully corrected, and the manufacturing cost of the optical element and the weight of the optical system are also controlled.

The principles, solutions and display results of the above eyepiece optical system will be further described below through more specific embodiments.

In the following examples, a diaphragm E may be the exit pupil of imaging for the eyepiece optical system, which is a virtual light exit aperture. When the pupils of the human eyes are at the diaphragm position, the best imaging effect can be observed. The spot diagram provided in the following embodiment reflects a geometric structure of the imaging of the optical system, ignores the diffraction effect, and is represented by defocused spots formed by the cross-section of the focused image plane with the specified field-of-view and the light of the specified wavelength, which can include multiple fields-of-view and light of multiple wavelengths at the same time. Therefore, the quality of the imaging quality of the optical system can be directly measured by the density, shape, and size of the defocused spots of the spot diagram, and the chromatic aberration of the optical system can be directly measured by the dislocation degree of the defocused spots with different wavelengths of the spot diagram. A smaller Root Mean Square (RMS) radius of the spot diagram results in a higher imaging quality of the optical system.

Example 1

The eyepiece design data of Example 1 is shown below in Table 1:

TABLE 1

| Surface | Curvature radius (mm) | Thickness (mm) | Lens Refractive index | Abbe number | Net aperture (mm) | Cone coefficient |
|---|---|---|---|---|---|---|
| Diaphragm | Infinite | 47 | | | 29.7581 | |
| 2 | −36.81803 | −20 | | reflection | 51.28161 | −13.19062 |
| 3 | Infinite | 7 | | reflection | 32.81093 | |
| 4 | Infinite | 15.78959 | | | 20.65268 | |
| 5 | 26.76817 | 9.27599 | 1.80999 | 41.000073 | 12.15226 | −19.5057 |
| 6 | −17.55049 | 0.1981692 | | | 12.94693 | −2.225001 |
| 7 | −29.56277 | 0.9965745 | 1.9459 | 17.943914 | 12.3449 | 2.331101 |
| 8 | 33.14961 | 0.8863538 | | | 12.35304 | 3.248082 |
| 9 | 22.85891 | 3.419771 | 1.88385 | 37.205485 | 14.56063 | −0.2472449 |
| 10 | 57.92243 | 6.106694 | | | 14.98012 | 44.87605 |
| 11 | 15.98515 | 3.31471 | 1.757 | 47.713789 | 22.14129 | |
| 12 | 21.70984 | 9.626206 | | | 21.33715 | |
| Image plane | Infinite | | | | 21.44313 | |

FIG. 1 is an optical path diagram of an eyepiece optical system according to Example 1, including: a first optical element L1 and a secondi optical element T2 arranged successively in an incident direction of an optical axis of human eyes, and a first lens group T1 located on an optical axis of a miniature image displayer IMG. The first optical element L1 has optical performance of transmission and reflection at the same time. The first optical element L1 is used for transmitting and reflecting an image light from the miniature image displayer IMG. The second optical element T2 includes an optical reflection surface L2, and the optical reflection surface L2 is concave to a human eye EYE viewing direction. The first optical element L1 reflects the image light refracted by the first lens group T1 to the second optical element T2, and then transmits the image light reflected by the second optical element T2 to the human eyes EYE.

An effective focal length $f_w$ of the eyepiece optical system is −26.08, an effective focal length $f_1$ of the first lens group T1 is 12.52, and an effective focal length $f_2$ of the second optical element T2 is 20.49. A distance $d_1$ along the optical axis between the first optical element L1 and the second optical element T2 is 20, and a distance $d_2$ along the optical axis between the first optical element L1 and the first lens group T1 is 32.07. The first lens group T1 includes a first sub-lens group T11, a second sub-lens group T12, a third sub-lens group T3, and a fourth sub-lens group T14. The first sub-lens group T11 is composed of a positive lens, which is a first lens T111, and an effective focal length $f_{11}$ of the first sub-lens group T111 is 9.95. The second sub-lens group T12 is composed of a negative lens, which is a third lens T121. The third sub-lens group T13 is composed of a positive lens, which is a fourth lens T131. The fourth sub-lens group T14 is composed of a fifth lens T141. An effective focal length $f_{12}$ of the second sub-lens group T12 is −11.37, an effective focal length $f_{111}$ of the first lens T111 is 9.95, an effective focal length $f_{13}$ of the third sub-lens group T13 is 19.33, and an effective focal length $f_{14}$ of the fourth sub-lens group T14 is 64.06. Then, $f_1/f_w$ is −0.48, $f_2/f_w$ is −0.78, $f_{11}/f_1$ is 0.79, $f_{111}/f_{11}$ is 1, $f_{12}/f_1$ is −0.91, $f_{13}/f_1$ is 1.54, $f_{14}/f_1$ is 5.12, $f_{121}$ is −11.37, $d_2/d_1$ is 1.54, and $\lambda_1$ is 72°.

FIG. 2, FIG. 3a, FIG. 3b, and FIG. 4 are respectively the spot diagram, the field curvature diagram, the distortion diagram, and the transfer function MTF plot, reflecting that respective field-of-view light in this example has high resolution and small optical distortion in the unit pixel of the image plane (miniature image displayer (IMG)). The resolution per 10 mm per unit period reaches more than 0.9. The aberrations of the optical system and image drift are well corrected, and a display portrait of uniformity and high optical performance can be observed through the eyepiece optical system.

Example 2

The eyepiece design data of Example 2 is shown below in Table 2:

TABLE 2

| Surface | Curvature radius (mm) | Thickness (mm) | Lens Refractive index | Abbe number | Net aperture (mm) | Cone coefficient |
|---|---|---|---|---|---|---|
| Diaphragm | Infinite | 37 | | | 5 | |
| 2 | −31.66126 | −15 | | reflecfion | 32.6238 | −4.4437 |
| 3 | Infinite | 25.4579 | | reflection | 21.42564 | |
| 4 | 58.09021 | 9.001287 | 1.713 | 53.868142 | 6.763383 | −50.0002 |
| 5 | −12.14766 | 0.1999881 | | | 8.359922 | −11.32412 |
| 6 | −22.55956 | 4.260367 | 1.8081 | 22.690566 | 8.365119 | −50.00108 |
| 7 | 96.63623 | 0.6934065 | | | 9.483358 | 41.8529 |
| 8 | −979.1421 | 2.524395 | 1.7725 | 49.613485 | 9.660126 | 49.35443 |
| 9 | −11.52598 | 0.4986225 | | | 10.30524 | |
| 10 | 8.684021 | 4.799284 | 1.61309 | 60.383719 | 11.72043 | |
| 11 | 9.906463 | 8.335471 | | | 9.94818 | |
| Image plane | Infinite | | | | 9.54541 | |

Figure 5:
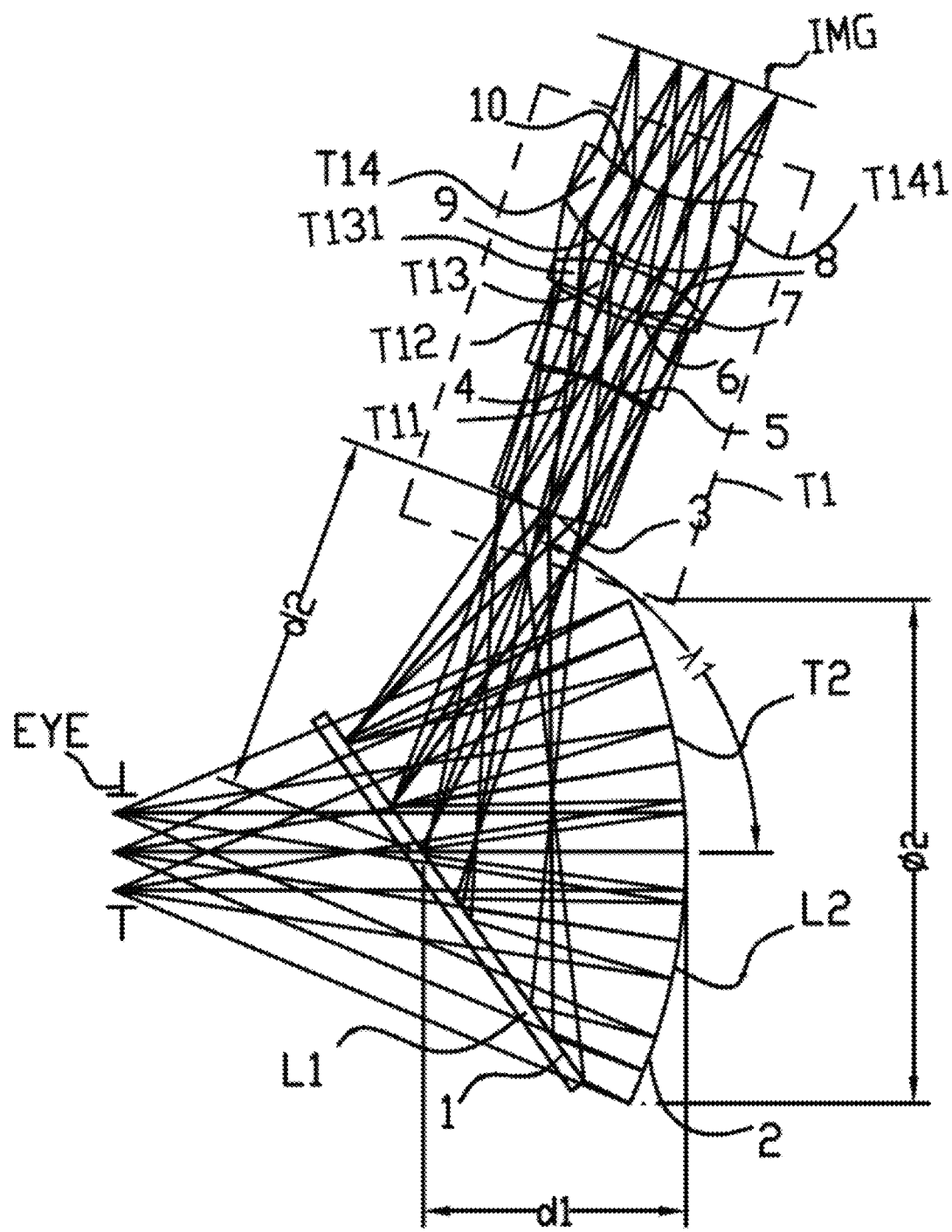
FIG. 5 is an optical path structural diagram of a reflective eyepiece optical system according to a second embodiment of the present invention.
Figure 6:
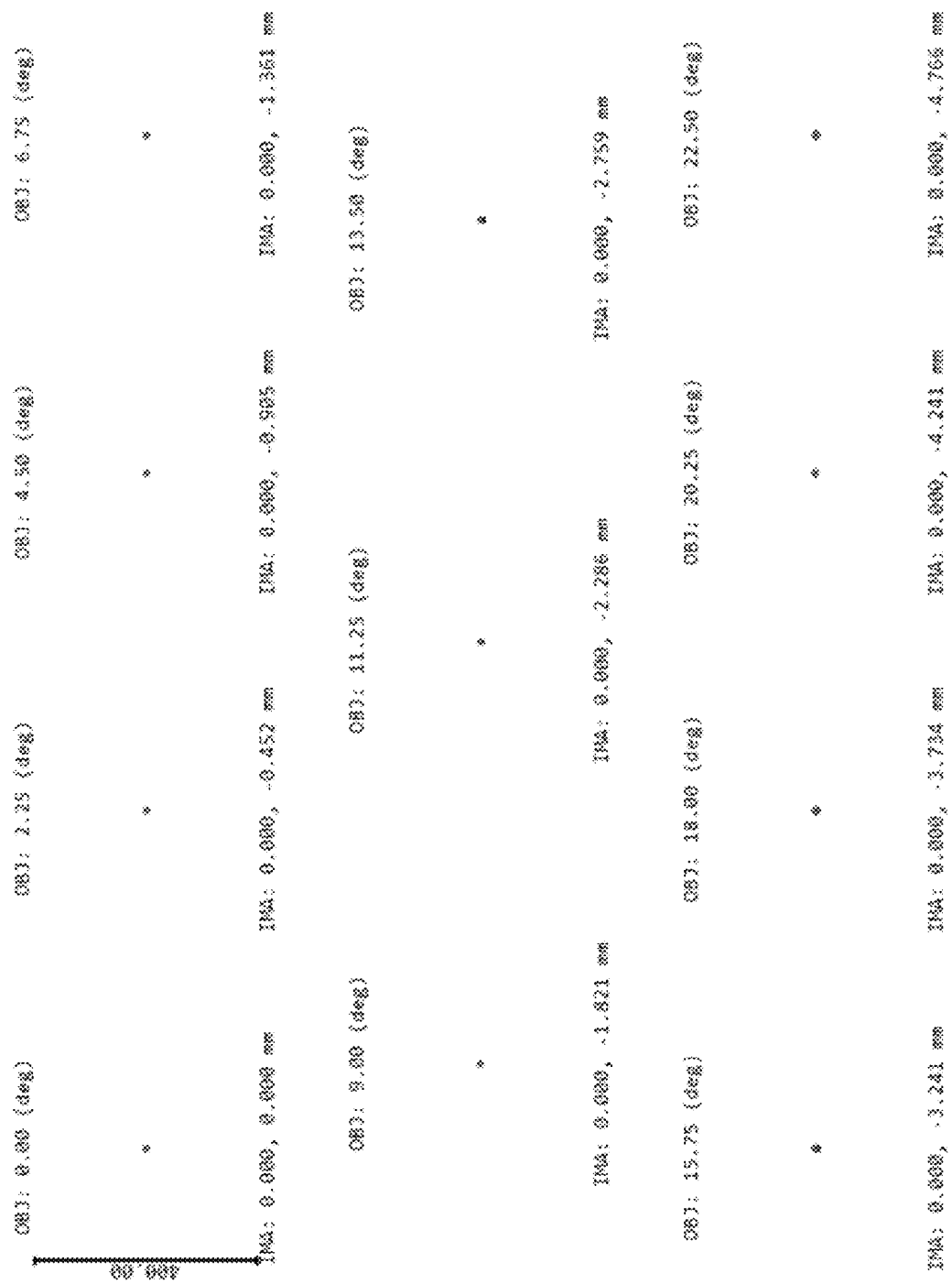
FIG. 6 is a schematic spot diagram of the reflective eyepiece optical system according to the second embodiment of the present invention.
Figure 7A:
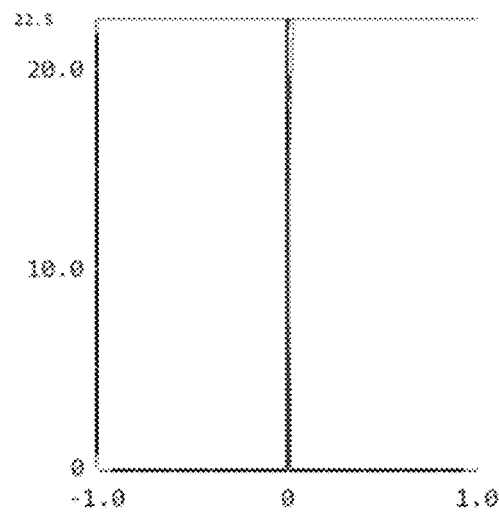
FIG. 7a is a schematic diagram of a field curvature of the reflective eyepiece optical system according to the second embodiment of the present invention.
Figure 7B:
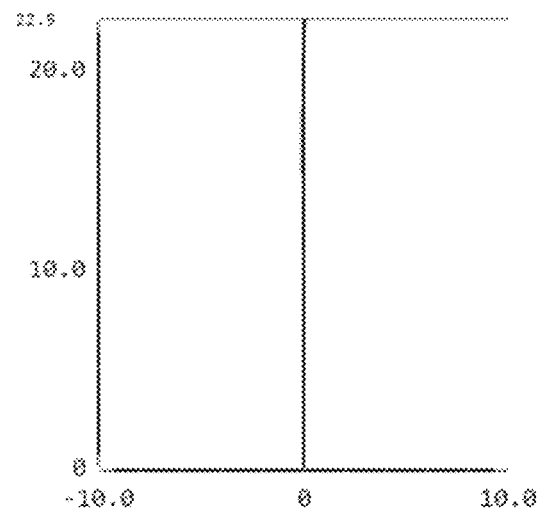
FIG. 7b is a schematic diagram of a distortion of the reflective eyepiece optical system according to the second embodiment of the present invention.
Figure 8:
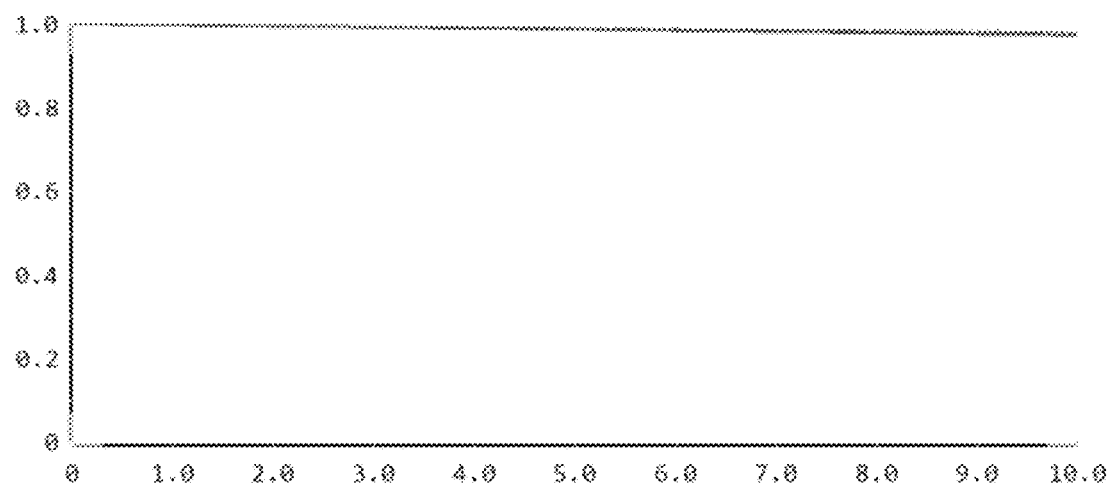
FIG. 8 is a plot of an optical MTF of the reflective eyepiece optical system according to the second embodiment of the present invention.

FIG. 5 is an optical path diagram of an eyepiece optical system according to Example 2, including: a first optical element L1 and a second optical element T2 arranged successively in an incident direction of an optical axis of human eyes, and a first lens group T1 located on an optical axis of a miniature image displayer IMG. The first optical element L1 has optical performance of transmission and reflection at the same time. The first optical element L1 is used for transmitting and reflecting an image light from the miniature image displayer IMG. The second optical element T2 includes an optical reflection surface L2, and the optical reflection surface L2 is concave to a human eye EYE viewing direction. The first optical element L1 reflects the image light refracted by the first lens group T1 to the second optical element T2, and then transmits the image light reflected by the second optical element T2 to the human eyes EYE.

An effective focal length $f_w$ of the eyepiece optical system is −11.49, an effective focal length $f_1$ of the first lens group T1 is 9.73, and an effective focal length $f_2$ of the second optical element T2 is 7.47. A distance $d_1$ along the optical axis between the first optical element L1 and the second optical element T2 is 17, and a distance $d_2$ along the optical axis between the first optical element L1 and the first lens group T1 is 23.46. The first lens group T1 includes a first sub-lens group T11, a second sub-lens group T12, a third sub-lens group T13, and a fourth sub-lens group T14. The first sub-lens group T11 is composed of a positive lens, which is a first lens T111, and an effective focal length $f_{11}$ of the first sub-lens group T11 is 10.18. The second sub-lens group T12 is composed of a negative les, which is a third lens T121. The third sub-lens group T13 is composed of positive lens, which is a fourth tens T131. The fourth sub-lens group T14 is composed of a fifth lens T141. An effective focal length $f_{12}$ of the second sub-lens group T12 is −5.39, an effective focal length $f_{13}$ of the third sub-lens group T13 is 8.83; and an effective focal length $f_{14}$ of the fourth sub-lens group T14 is 21.02. Then, $f_1/f_w$ is −0.85, $f_2/f_w$ is −0.65, $f_{11}/f_1$ is 1.05, $f_{111}/f_{11}$ is 1, $f_{12}/f_1$ is −0.55, $f_{13}/f_1$ is 0.908, $f_{14}/f_1$ is 2.16, $f_{121}$ is −5.39, $d_2/d_1$ is 1.39, and $\lambda_1$ is 70°.

FIG. 6, FIG. 7a, FIG. 7b, and FIG. 8 are respectively the spot diagram, the field curvature diagram, the distortion diagram, and the transfer function MTF plot, reflecting that respective field-of-view light in this example has high resolution and small optical distortion in the unit pixel of the image plane (miniature image displayer (IMG)). The resolution per 10 mm per unit period reaches more than 0.9. The aberrations of the optical system and image drift are well corrected, and a display portrait of uniformity and high optical performance can be observed through the eyepiece optical system.

Example 3

The eyepiece design data of Example 3 is shown below in Table 3:

TABLE 3

| Surface | Curvature radius (max) | Thickness (mm) | Lens Refractive index | Abbe number | Net aperture (mm) | Cone coefficient |
|---|---|---|---|---|---|---|
| Diaphragm | Infinite | 48 | | | 5 | |
| 2 | −55.6533 | −22.6 | | reflection | 42.08992 | −15.05038 |
| 3 | Infinite | 38.15881 | | reflection | 28.03543 | |
| 4 | Infinite | 40 | | reflection | 10.25769 | |

TABLE 3-continued

| Surface | Curvature radius (max) | Thickness (mm) | Lens Refractive index | Lens Abbe number | Net aperture (mm) | Cone coefficient |
|---|---|---|---|---|---|---|
| 5 | −16.72401 | −2.960563 | 1.6938 | 53.151009 | 15.6 | −1.219684 |
| 6 | −55.52381 | −2.738939 | | | 15.6 | 12.86236 |
| 7 | −24.07627 | −5.37627 | 1.58313 | 59.455980 | 16 | −1.283208 |
| 8 | 14.63576 | −0.1686679 | | | 16 | 0.1537356 |
| 9 | 16.08364 | −3.214711 | 1.6397 | 23.530454 | 15.2 | −3.587886 |
| 10 | −65.66449 | −8.000509 | | | 15.2 | 8.387683 |
| 11 | −24.12175 | −2.845956 | 1.6584 | 50.866500 | 21 | 0.04313194 |
| 12 | −59.55044 | −3.411949 | | | 21 | 28.94518 |
| 13 | −18.80983 | −4.565057 | 1.7725 | 49.613485 | 24 | |
| 14 | −19.86844 | −7.549287 | | | 22 | |
| Image plane | Infinite | | | | 14.08951 | |

Figure 9A:
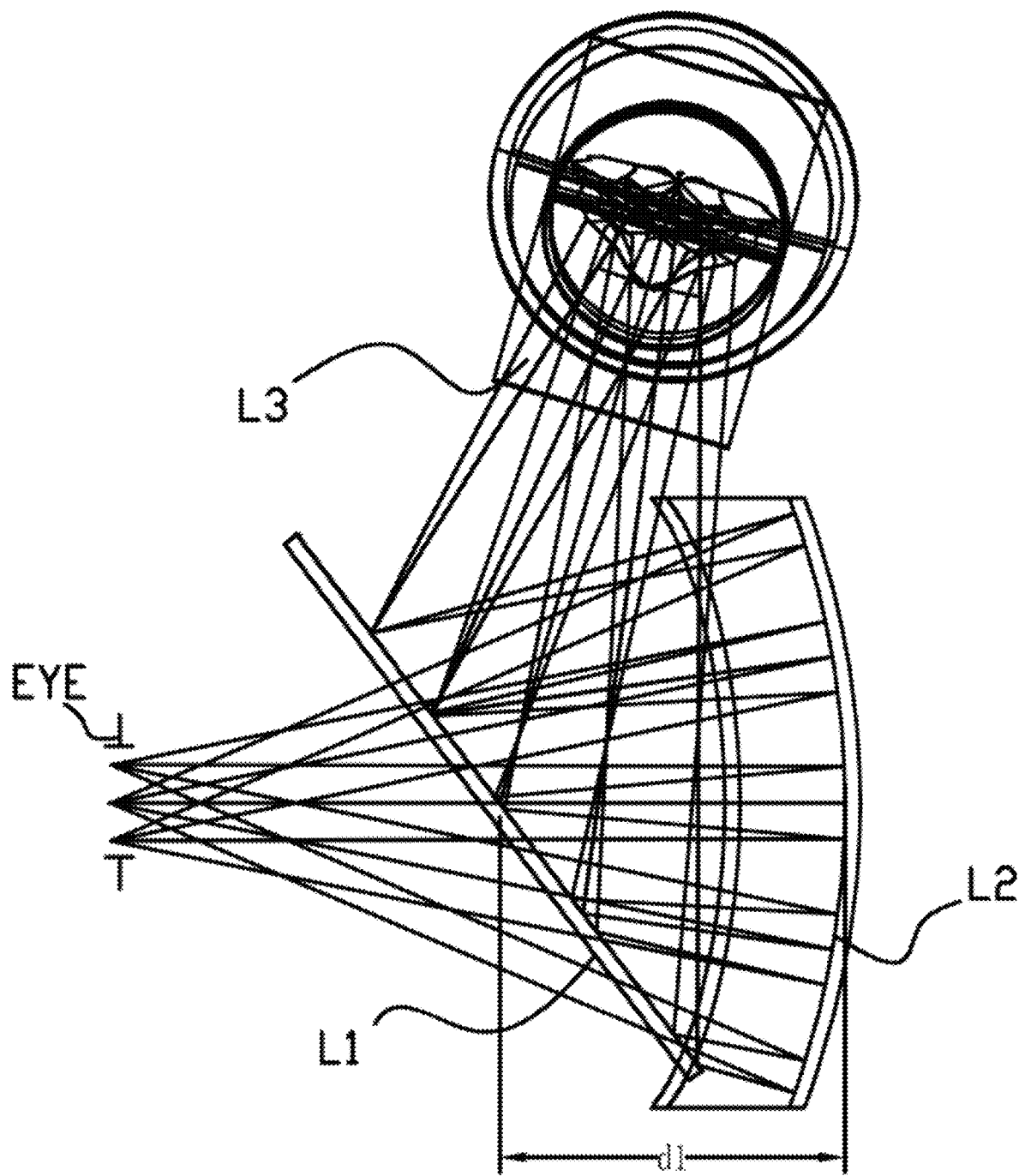
FIG. 9a is a front view of an optical path structure of a reflective eyepiece optical system according to a third embodiment of the present invention.
Figure 9B:
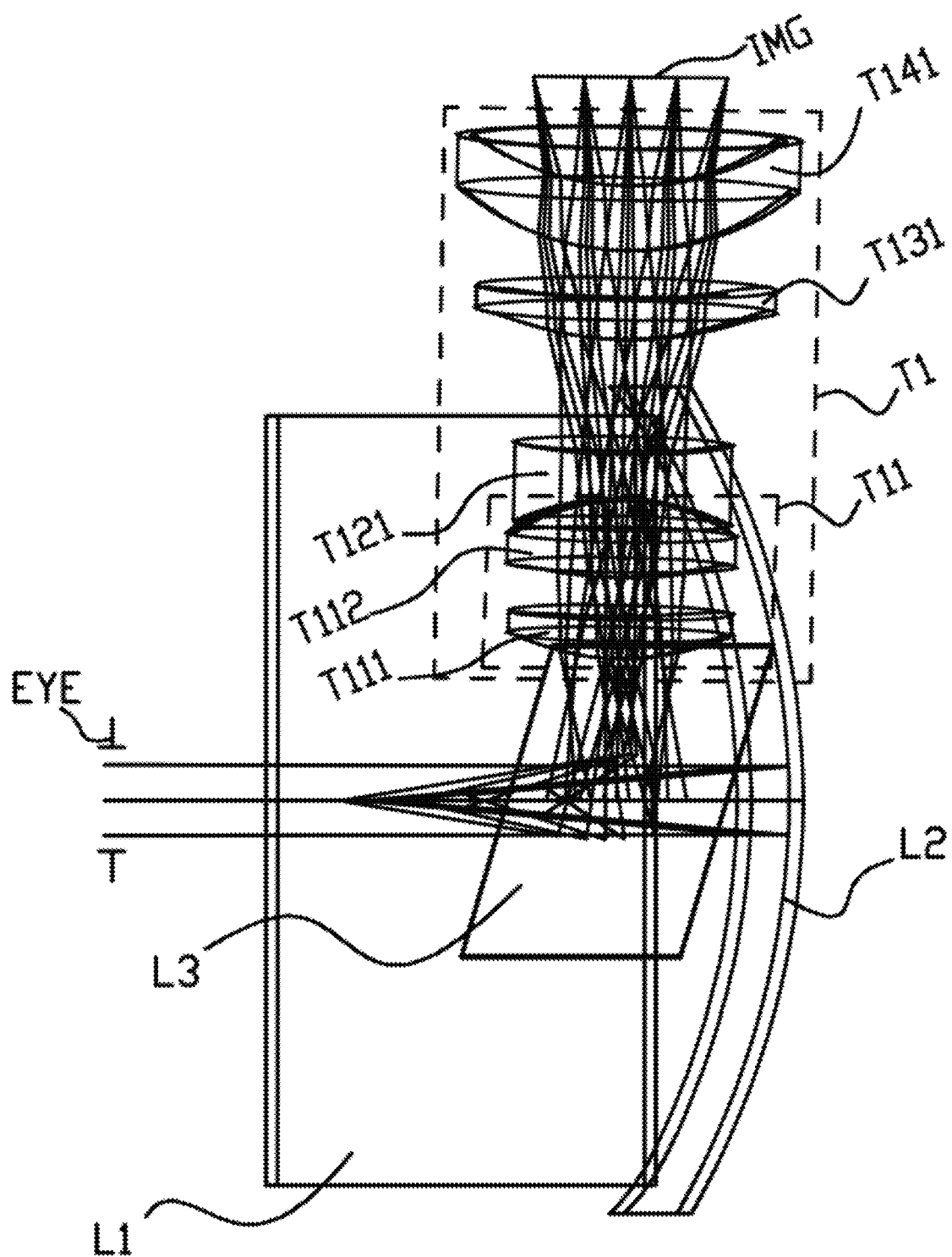
FIG. 9b is a top view of the optical path structure of the reflective eyepiece optical system according to the third embodiment of the present invention.
Figure 11A:
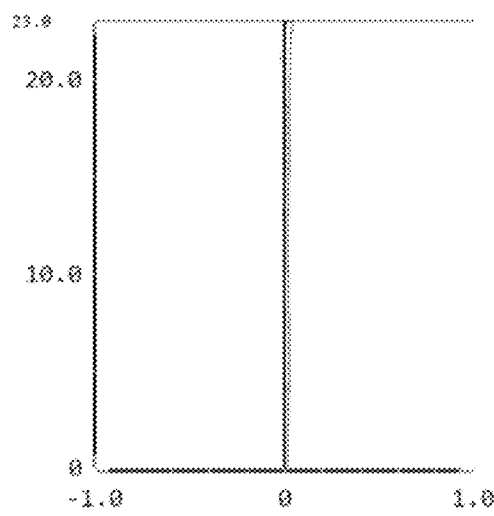
FIG. 11a is a schematic diagram of a field curvature of the reflective eyepiece optical system according to the third embodiment of the present invention.
Figure 11B:
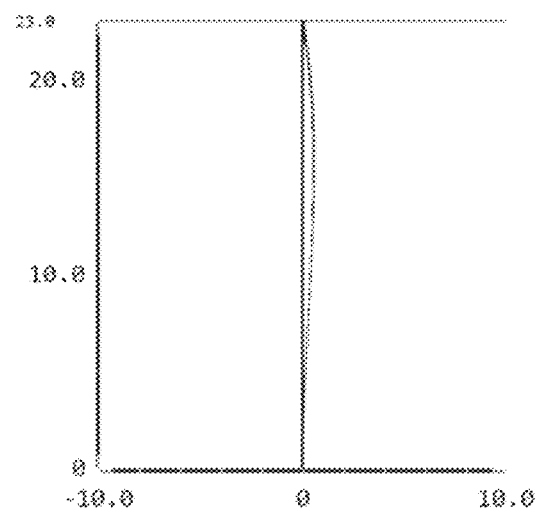
FIG. 11b is a schematic diagram of a distortion of the reflective eyepiece optical system according to the third embodiment of the present invention.
Figure 12:
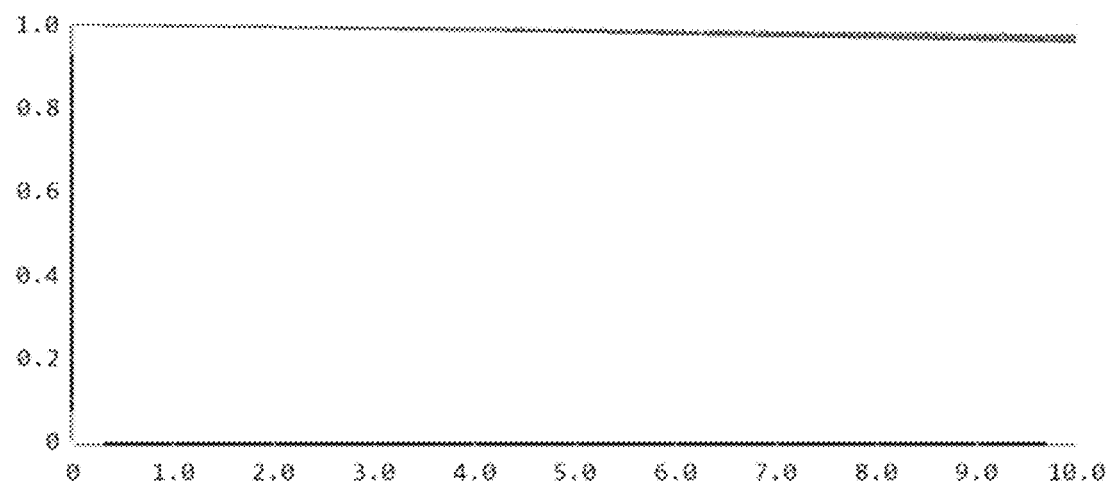
FIG. 12 is a plot of an optical MTF of the reflective eyepiece optical system according to the third embodiment of the present invention.

FIG. 9a and FIG. 9b are a front view and a top view of an optical path structure according to Example 3, including: a first optical element L1 and a second optical element T2 arranged successively in an incident direction of an optical axis of human eyes, and a first lens group T1 located on an optical axis of a miniature image displayer IMG, and further including a planar reflective optical element L3 located between the first lens group and the first optical element. The first optical element L1 has optical performance of transmission and reflection at the same time. The first optical element L1 is used for transmitting and reflecting an image light from the miniature image displayer IMG. The second optical element T2 includes an optical reflection surface L2, and the optical reflection surface L2 is concave to a human eye EYE viewing direction. The planar reflective optical element L3 reflects the image light refracted by the first lens group T1 to the first optical element L1, and the first optical element L1 reflects the image light to the second optical element T2, and then transmits the image light reflected by the second optical element T2 to the human eyes EYE.

An effective focal length $f_w$ of the eyepiece optical system is −16.8, an effective focal length $f_1$ of the first lens group T1 is 18.43, and an effective focal length $f_2$ of the second optical element T2 is 27.83. A distance $d_1$ along the optical axis between the first optical element L1 and the second optical element T2 is 22.6, and a distance $d_2$ along the optical axis between the first optical element L1 and the first lens group T1 is 48.16. The first lens group T1 includes a first sub-lens group T11, a second sub-lens group T12, a third sub-lens group T13, and a fourth sub-lens group T14. The first sub-lens group T11 is composed of two positive lenses, which are respectively a first lens T111 distant from the miniature image displayer IMG side and a second lens T112 proximate to the miniature image displayer IMG side. An effective focal length $f_1$ of the first sub-lens group T11 is 12.94, and an effective focal length $f_{111}$ of the first lens T111 is 33.45. The second sub-lens group T12 is composed of one lens, which is a third lens T121. The third sub-lens group T13 is composed of a positive lens, which is a fourth lens T131. The fourth sub-lens group T14 is composed of a fifth lens T141. An effective focal length $f_{12}$ of the second sub-lens group T12 is −19.89, an effective focal length $f_{13}$ of the third sub-lens group T13 is 59.67, and an effective focal length $f_{14}$ of the fourth sub-lens group T14 is 158.7, wherein, $d_2$ consists of $d_{21}$ and $d_{22}$. Then, $f_1/f_w$ is −1.1, $f_2/f_w$ is −1.66, $f_{11}/f_1$ is 0.7, $f_{111}/f_{11}$ is 2.59, $f_{12}/f_1$ is −1.08, $f_{13}/f_1$ is 3.24, $f_{14}/f_1$ is 8.61, an effective focal length $f_{121}$ of the third lens T121 is −19.89, $d_2/d_1$ is 2.13, $\lambda_1$ is 72°, and $\lambda_2$ is 90°.

FIG. 10, FIG. 11a, FIG. 11b, and FIG. 12 are respectively the spot diagram, the field curvature diagram, the distortion diagram, and the transfer function MTF plot, reflecting that respective field-of-view light in this example has high resolution and small optical distortion in the unit pixel of the image plane (miniature image displayer (IMG)). The resolution per 10 mm per unit period reaches more than 0.9. The aberrations of the optical system and image drift are well corrected, and a display portrait of uniformity and high optical performance can be observed through the eyepiece optical system.

Example 4

The eyepiece design data of Example 4 is shown below in Table 4:

TABLE 4

| Surface | Curvature radius (mm) | Thickness (mm) | Lens Refractive index | Lens Abbe number | Net aperture (mm) | Cone coefficient |
|---|---|---|---|---|---|---|
| Diaphragm | Infinite | 47 | | | 5 | |
| 2 | −54.43931 | −24 | | reflection | 48.95158 | −14.05856 |
| 3 | Infinite | 32.3114 | | reflection | 59.65487 | |
| 4 | Infinite | −10 | | reflection | 13.32531 | |
| 5 | −16.44166 | −2.618275 | 1.53116 | 56.043828 | 7.833633 | −1.749706 |
| 6 | −32.72957 | −2.152342 | | | 7.364828 | −34.94002 |
| 7 | −16.67698 | −6.506248 | 1.651133 | 55.903805 | 8.317541 | −2.015585 |
| 8 | 15.67356 | −0.2656935 | | | 8.599111 | 0.8499103 |
| 9 | 20.37391 | −3.964838 | 1.64219 | 22.408848 | 8.492684 | −3.615109 |
| 10 | −29.40104 | −2.29513 | | | 9.577369 | −16.08668 |
| 11 | −142.7324 | −4.385973 | 1.72 | 50.351963 | 10.89104 | −4.662146 |

TABLE 4-continued

| Surface | Curvature radius (mm) | Thickness (mm) | Lens Refractive index | Abbe number | Net aperture (mm) | Cone coefficient |
|---|---|---|---|---|---|---|
| 12 | 61.45032 | −6.68695 | | | 12.29765 | 9.621991 |
| 13 | −17.92474 | −5 | 1.80999 | 41.000073 | 16.57147 | −6.966687 |
| 14 | −19.54462 | −6.85811 | | | 15.97538 | −0.1664377 |
| Image plane | Infinite | | | | 17.60037 | |

Figure 13A:
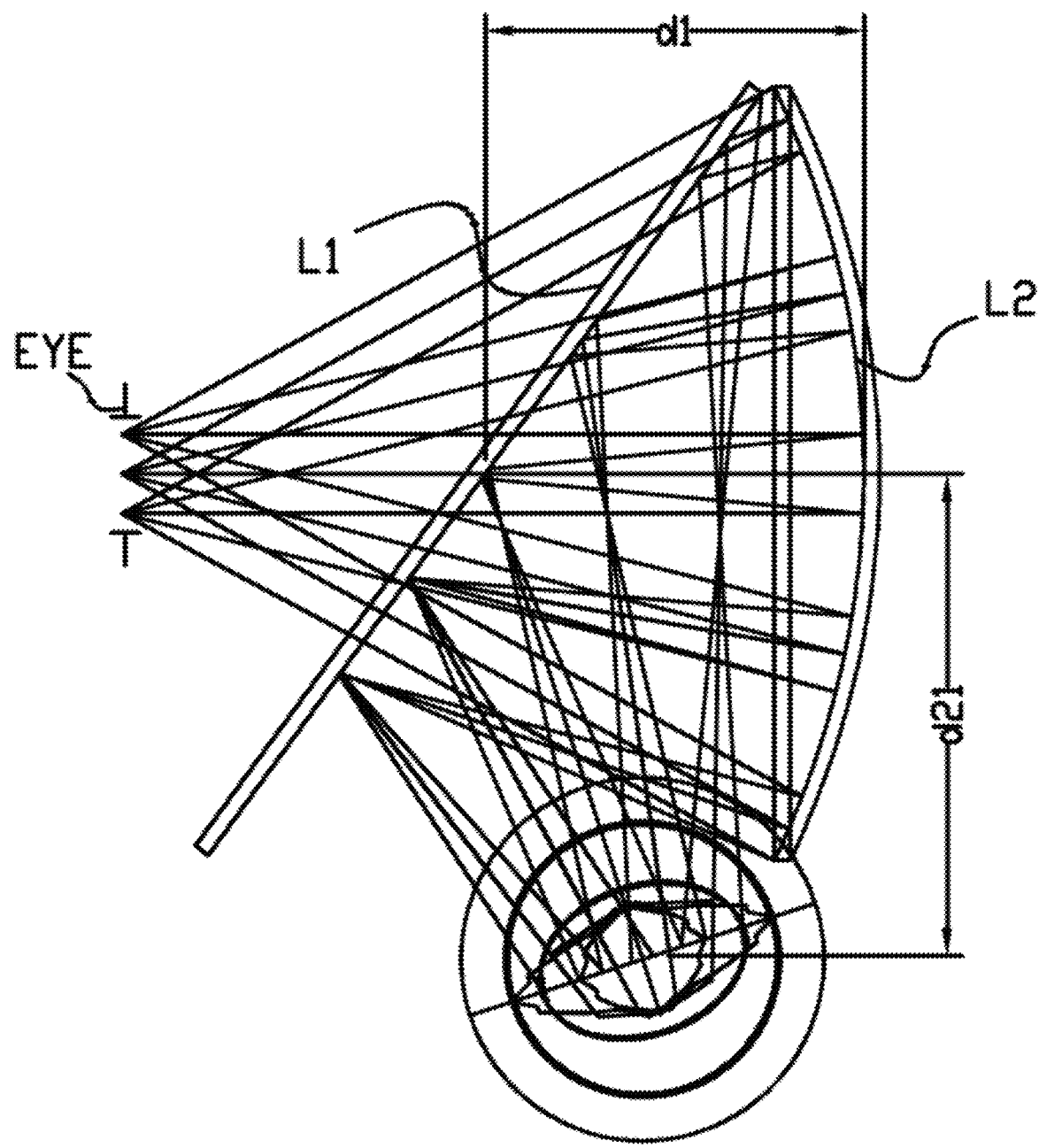
FIG. 13a is a front view of an optical path structure of a reflective eyepiece optical system according to a fourth embodiment of the present invention.
Figure 13B:
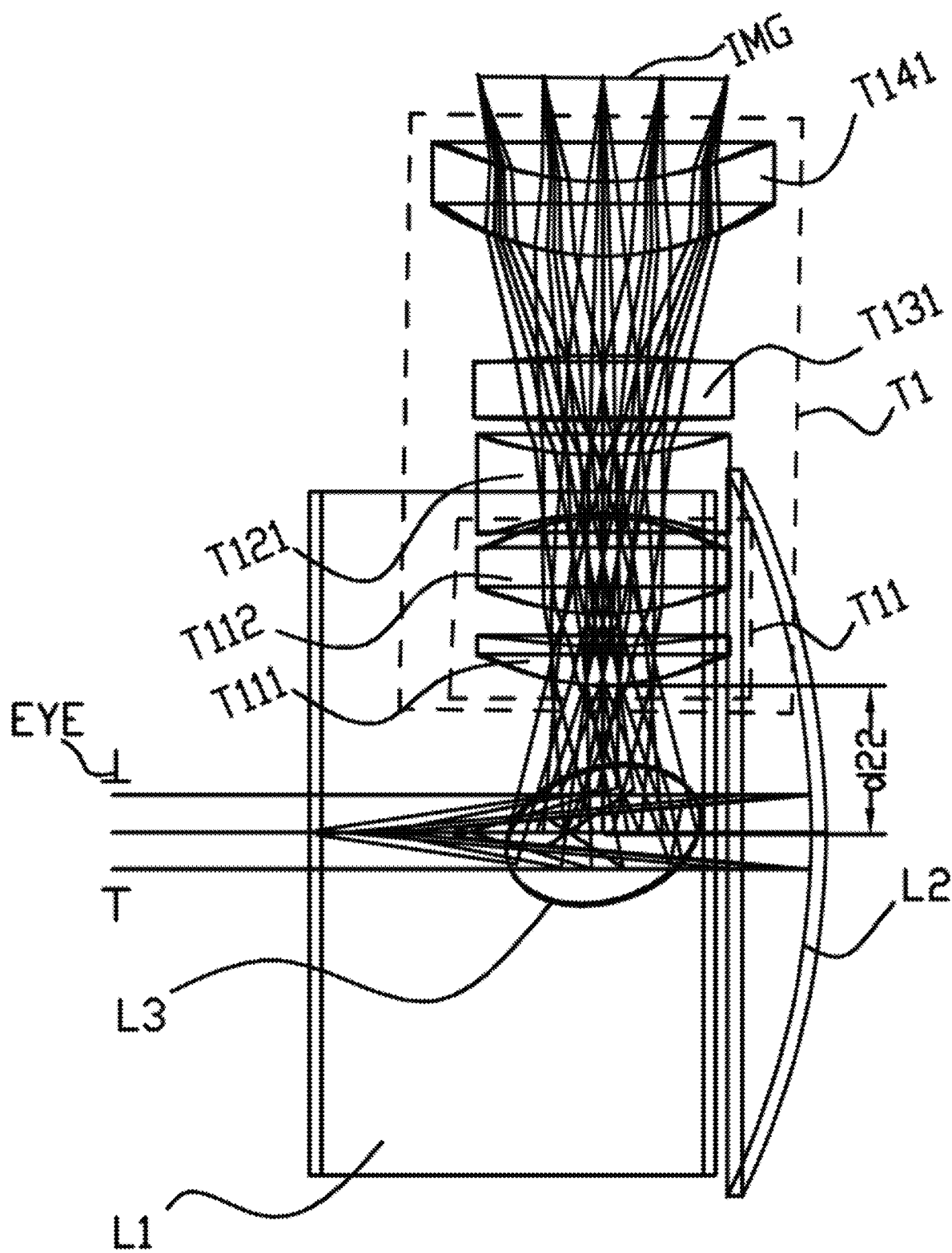
FIG. 13b is a top view of the optical path structure of the reflective eyepiece optical system according to the fourth embodiment of the present invention.
Figure 15A:
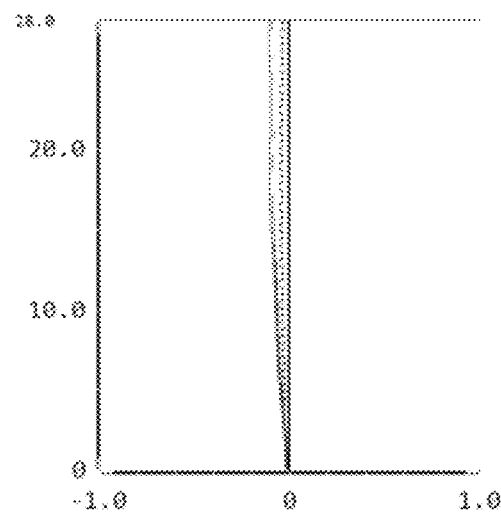
FIG. 15a is a schematic diagram of a field curvature of the reflective eyepiece optical system according to the fourth embodiment of the present invention.
Figure 15B:
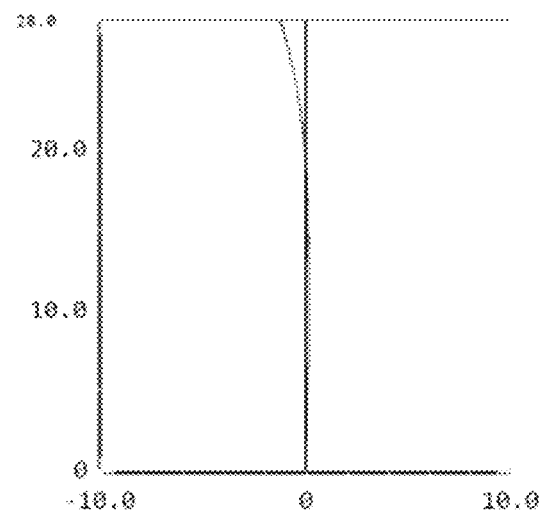
FIG. 15b is a schematic diagram of a distortion of the reflective eyepiece optical system according to the fourth embodiment of the present invention.
Figure 16:
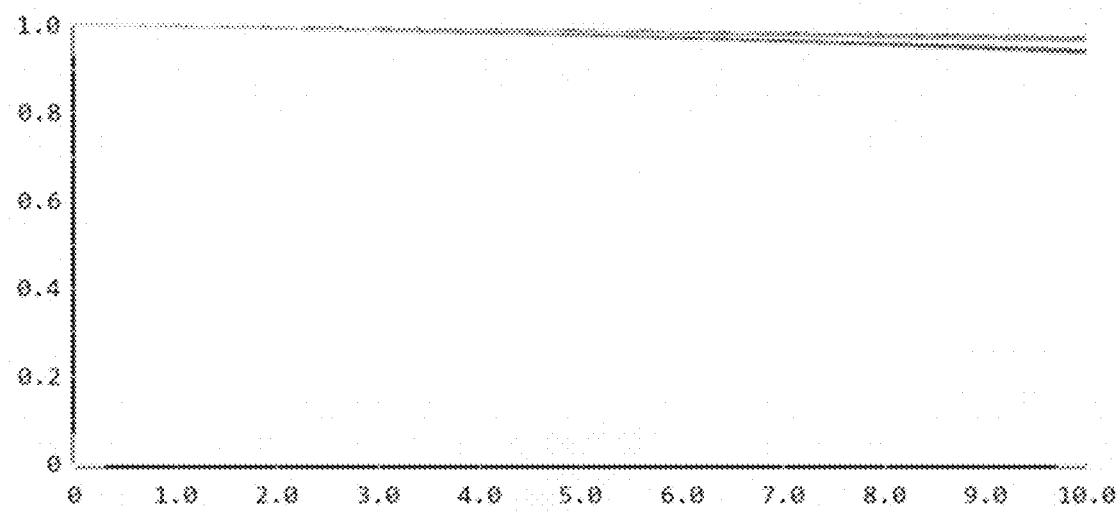
FIG. 16 is a plot of an optical MTF of the reflective eyepiece optical system according to the fourth embodiment of the present invention.

FIG. 13a and FIG. 13b are a front view and a top view of an optical path structure according to Example 4, including: a first optical element L1 and a second optical element T2 arranged successively in an incident direction of an optical axis of human eyes, and a first lens group T1 located on an optical axis of a miniature image displayer IMG, and further including a planar reflective optical element L3 located between the first lens group and the first optical element. The first optical element L1 has optical performance of transmission and reflection at the same time. The first optical element L1 is used for transmitting and reflecting an image light from the miniature image displayer IMG. The second optical element T2 includes an optical reflection surface L2, and the optical reflection surface L2 is concave to a human eye EYE viewing direction. The planar reflective optical element L3 reflects the image light refracted by the first lens group T1 to the first optical element L1, and the first optical element L1 reflects the image light to the second optical element T2, and then transmits the image light reflected by the second optical element T2 to the human eyes EYE.

An effective focal length $f_w$ of the eyepiece optical system is −16.7, an effective focal length $f_1$ of the first lens group T1 is 16.76, and an effective focal length $f_2$ of the second optical element T2 is 27.22. A distance $d_1$ along the optical axis between the first optical element L1 and the second optical element T2 is 24, and a distance $d_2$ along the optical axis between the first optical element L1 and the first lens group T1 is 42.31. The first lens group T1 includes a first sub-lens group T11, a second sub-lens group T12, a third sub-lens group T13, and a fourth sub-lens group T14. The first sub-lens group T11 is composed of two positive lenses, which are respectively a first lens T111 distant from the miniature image displayer IMG side and a second lens T112 proximate to the miniature image displayer IMG side. An effective focal length $f_{11}$ of the first sub-lens group T11 is 12.26, and an effective focal length $f_{111}$ of the first lens T111 is 58.91. The second sub-lens group T12 is composed of a negative lens, which is a third lens T121. The third sub-lens group T13 is composed of a positive lens, which is a fourth lens T131. The fourth sub-lens group T14 is composed of a fifth lens T141. An effective focal length $f_{12}$ of the second sub-lens group T12 is −18.17, an effective focal length $f_{13}$ of the third sub-lens group T13 is 60.2, and an effective focal length $f_{14}$ of the fourth sub-lens group T14 is 112.12, wherein, $d_2$ consists of $d_{21}$ and $d_{22}$. Then, $f_1/f_w$ is −1.0, $f_2/f_w$ is −1.63, $f_{11}/f_1$ is 0.73, $f_{111}/f_{11}$ is 4.81, $f_{12}/f_1$ is −1.08, $f_{13}/f_1$ is 3.59, $f_{14}/f_1$ is 6.69, an effective focal length $f_{121}$ of the third lens T121 is −18.17, $d_2/d_1$ is 1.76, $\lambda_1$ is 74°, and $\lambda_2$ is 90°.

FIG. 14, FIG. 15a, FIG. 15b, and FIG. 16 are respectively the spot diagram, the field curvature diagram, the distortion diagram, and the transfer function MTF plot, reflecting that respective field-of-view light in this example has high resolution and small optical distortion in the unit pixel of the image plane (miniature image displayer (IMG)). The resolution per 10 mm per unit period reaches more than 0.9. The aberrations of the optical system and image drift are well corrected, and a display portrait of uniformity and high optical performance can be observed through the eyepiece optical system.

Example 5

The eyepiece design data of Example 5 is shown below in Table 5:

TABLE 5

| Surface | Curvature radius (mm) | Thickness (mm) | Lens Refractive index | Abbe number | Net aperture (mm) | Cone coefficient |
|---|---|---|---|---|---|---|
| Diaphragm | Infinite | 47.84238 | | | 5 | |
| 2 | −48.03538 | −24 | | reflection | 48.74504 | −10.60062 |
| 3 | Infinite | 27 | | reflection | 58.43923 | |
| 4 | 13.09922 | 2.315851 | 1.5311 | 56.043828 | 14.2 | −1.701307 |
| 5 | 25.99627 | 2.559584 | | | 14.2 | −21.67233 |
| 6 | 15.43821 | 4.899347 | 1.65113 | 55.903805 | 15.6 | −2.535522 |
| 7 | −16.5758 | 0.2107574 | | | 15.6 | 0.9678087 |
| 8 | −17.55681 | 2.201265 | 1.6421 | 22.408848 | 15.8 | −4.956789 |
| 9 | 22.32125 | 2.069532 | | | 16.6 | −14.55218 |
| 10 | 18.17215 | 4.279806 | 1.72 | 50.351963 | 19.8 | −6.615312 |
| 11 | −56.13364 | 10.10333 | | | 20.2 | 18.46187 |
| 12 | 15.51061 | 3.095794 | 1.80999 | 41.000073 | 22.6 | −1.011432 |
| 13 | 13.33294 | 3.131787 | | | 22.6 | −0.9285377 |
| Image plane | Infinite | | | | 17.24 | |

Figure 17:
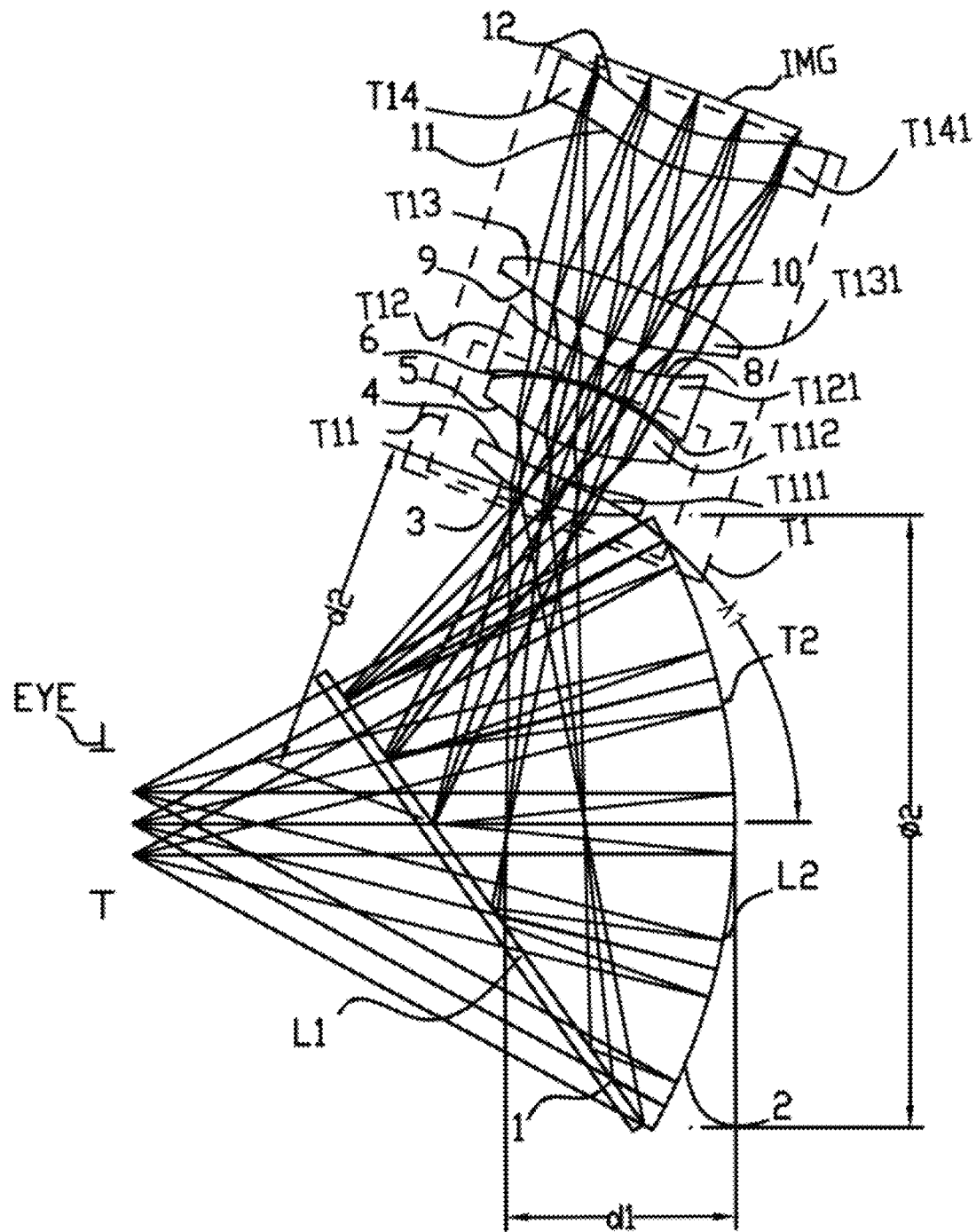
FIG. 17 is an optical path structural diagram of a reflective eyepiece optical system according to a fifth embodiment of the present invention.
Figure 18:
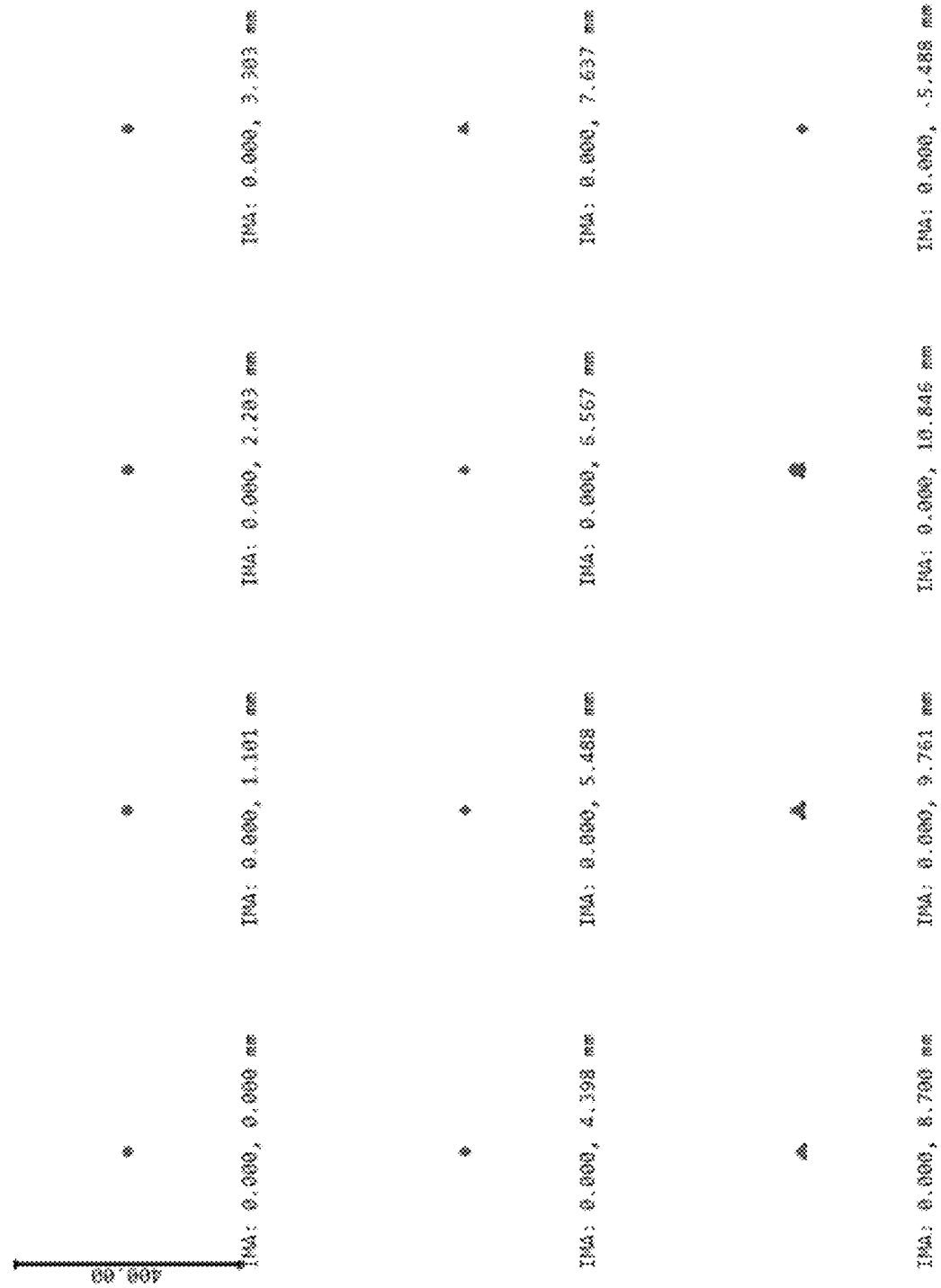
FIG. 18 is a schematic spot diagram of the reflective eyepiece optical system according to the fifth embodiment of the present invention.
Figure 19A:
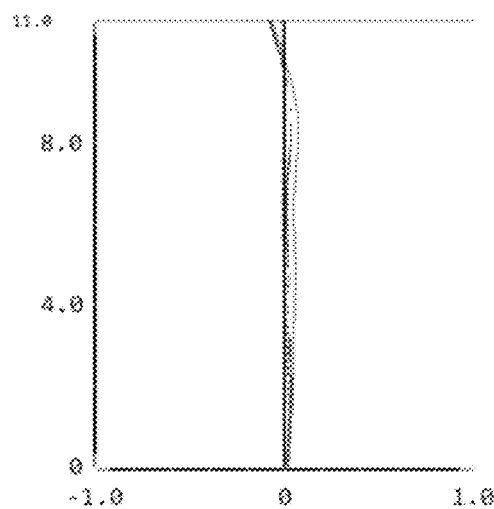
FIG. 19a is a schematic diagram of a field curvature of the reflective eyepiece optical system according to the fifth embodiment of the present invention.
Figure 19B:
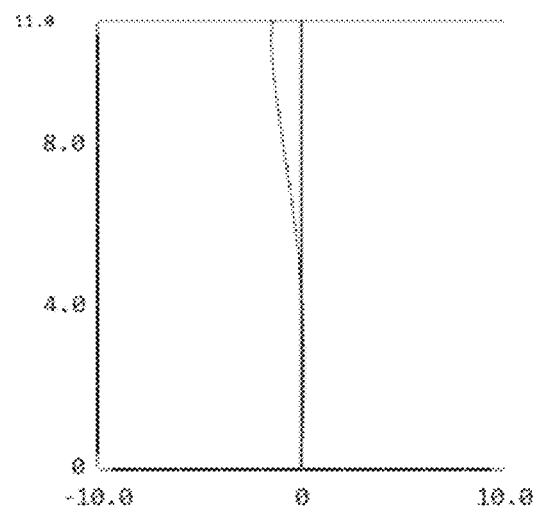
FIG. 19b is a schematic diagram of a distortion of the reflective eyepiece optical system according to the fifth embodiment of the present invention.
Figure 20:
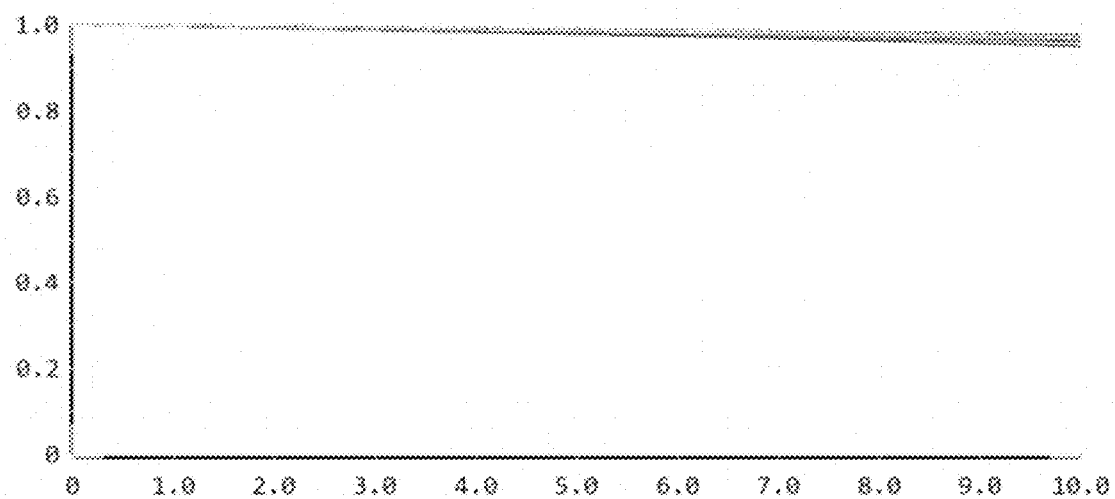
FIG. 20 is a plot of an optical MTF of the reflective eyepiece optical system according to the fifth embodiment of the present invention.

FIG. 17 is an optical path diagram of an eyepiece optical system according to Example 5, including: a first optical element L1 and a second optical element T2 arranged successively in an incident direction of an optical axis of human eyes, and a first lens group T1 located on an optical axis of a miniature image displayer IMG. The first optical element L1 has optical performance of transmission and reflection at the same time. The first, optical element L1 is used for transmitting and reflecting an image light from the miniature image displayer IMG. The second optical element T2 includes an optical reflection surface L2, and the optical reflection surface L2 is concave to a human eye EYE viewing direction. The first optical element L1 reflects the image light refracted by the first lens group T1 to the second optical element T2, and then transmits the image light reflected by the second optical element T2 to the human eyes EYE. The optical path structure further includes a planar reflective optical element L3 located between the first lens group T1 and the first optical element L1. The planar reflective optical element L3 reflects the image light refracted by the first lens group T1 to the first optical element L1, and the first optical element L1 reflects the image light to the second optical element T2, and then transmits the image light reflected by the second optical element T2 to the human eyes EYE.

An effective focal length $f_w$ of the eyepiece optical system is −16.49, an effective focal length $f_1$ of the first lens group T1 is 12.97, and an effective focal length $f_2$ of the second optical element T2 is 24.11. A distance $d_1$ along the optical axis between the first optical element L1 and the second optical element T2 is 30, and a distance $d_2$ along the optical axis between the first optical element L1 and the first lens group T1 is 21. The first lens group T1 includes a first sub-lens group T11, a second sub-lens group T12, a third sub-lens group T13, and a fourth sub-lens group T14. The first sub-lens group T11 is composed of two positive lenses, which are respectively a first lens T111 distant from the miniature image displayer IMG side and a second lens T112 proximate to the miniature image displayer IMG side. An effective focal length $f_{11}$ of the first sub-lens group T11 is 11.56, and an effective focal length fit of the first lens T111 is 46.79. The second sub-lens group T12 is composed of a negative lens, which is a third lens T121. The third sub-lens group T13 is composed of a positive lens, which is a fourth lens T131. The fourth sub-lens group T14 is composed of a fifth lens T141. An effective focal length $f_{12}$ of the second sub-lens group T12 is −14.98, an effective focal length $f_{13}$ of the third sub-lens group T13 is 19.54, and an effective focal length $f_{14}$ of the fourth sub-lens group T14 is −322.30. Then, $f_1/f_w$ is −0.79, $f_2/f_w$ is −1.46, $f_{11}/f_1$ is 0.89, $f_{111}/f_{11}$ is 4.05, $f_{12}/f_1$ is −1.15, $f_{13}/f_1$ is 1.51, $f_{14}/f_1$ is −24.85, an effective focal length $f_{121}$ of the third lens T121 is −14.98, $d_2/d_1$ is 0.70, and $\lambda_1$ is 74°.

FIG. 18, FIG. 19a, FIG. 19b, and FIG. 20 are respectively the spot diagram, the field curvature diagram, the distortion diagram, and the transfer function MTF plot, reflecting that respective field-of-view light in this example has high resolution and small optical distortion in the unit pixel of the image plane (miniature image displayer (IMG)). The resolution per 10 mm per unit period reaches more than 0.9. The aberrations of the optical system and image drift are well corrected, and a display portrait of uniformity and high optical performance can be observed through the eyepiece optical system.

The data of the above first to fifth examples all meet parameter requirements recorded in the Summary of the invention, and results are shown in the following Table 6:

TABLE 6

|  | $f_1/f_w$ | $f_2/f_w$ | $f_{11}/f_1$ | $f_{111}/f_{11}$ | $f_{12}/f_1$ | $f_{13}/f_1$ |
|---|---|---|---|---|---|---|
| Example 1 | −0.48 | −0.78 | 0.79 | 1 | −0.91 | 1.54 |
| Example 2 | −0.85 | −0.65 | 1.05 | 1 | −0.55 | 1.39 |
| Example 3 | −1.1 | −1.66 | 0.7 | 2.59 | −1.08 | 3.24 |
| Example 4 | −1.0 | −1.63 | 0.73 | 4.81 | −1.08 | 3.59 |
| Example 5 | −0.79 | −1.46 | 0.89 | 4.05 | −1.15 | 1.51 |

The present application provides a head-mounted near-to-eye display device, including a miniature image displayer, and further including the reflective eyepiece optical system according to any one of the above items; the eyepiece optical system is located between the human eyes and the miniature image displayer.

Preferably, the miniature image display is an organic electroluminescent device.

Preferably, the head-mounted near-to-eye display device includes two identical reflective eyepiece optical systems.

To sum up, the first lens group of the reflective eyepiece optical system in the above examples of the present invention includes four sub-lens groups, which are the first sub-lens group, the second sub-lens group, the third sub-lens group, and the fourth sub-lens group, respectively. The first sub-lens group, the second sub-lens group, the third sub-lens group, and the fourth sub-lens group adopt a specific focal length combination, which fully corrects the aberrations of the system and improves the optical resolution of the system. More importantly, with the transmission and reflection properties of the first optical element, the second optical element has a reflection surface, which effectively folds the optical path, reduces the overall size of the eyepiece optical system, and improves the possibility of subsequent mass production. On the basis of miniaturization, cost and weight reduction for the article, the aberrations of the optical system are greatly eliminated, and the basic optical indicators are also improved, ensuring high image quality and increasing the size of the picture angle. Therefore, an observer can watch large images of full frame, high definition and uniform image quality without any distortion and get visual experience of high liveness via the present invention, which is suitable for head-mounted near-to-eye display devices and similar devices thereof.

It should be understood that, for one of ordinary skill in the art, the foregoing description can be modified or altered, and all such modifications and alterations fall into the scope of the attached claims of the present invention.

What is claimed is:

1. A reflective eyepiece optical system, composed of a first optical element and a second optical element arranged successively in an incident direction of an optical axis of human eyes, and a first lens group located on an optical axis of a miniature image displayer; wherein the first optical element is used for transmitting and reflecting an image light from the miniature image displayer; the second optical element comprises an optical reflection surface, and the optical reflection surface is concave to the human eyes; the first optical element reflects the image light refracted by the first lens group to the second optical element, and then transmits the image light reflected by the second optical element to the human eyes;

an effective focal length of the eyepiece optical system is $f_w$, an effective focal length of the first lens group is $f_1$, an effective focal length of the second optical element is $f_2$, and $f_w$, $f_1$, and $f_2$ satisfy the following relations (1) and (2):

$$f_1/f_w < -0.47 \tag{1};$$

$$-2.53 < f_2/f_w < -0.64 \tag{2};$$

the first lens group comprises a first sub-lens group, a second sub-lens group, a third sub-lens group, and a fourth sub-lens group arranged coaxially and successively along the optical axis from a human eye viewing side to the miniature image displayer side; effective focal lengths of the first sub-lens group, the second sub-lens group, and the third sub-lens group are a combination of positive, negative and positive; the effective focal length of the first sub-lens group is $f_{11}$, the effective focal length of the second sub-lens group is $f_{12}$, the effective focal length of the third sub-lens group is $f_{13}$, and $f_{11}$, $f_{12}$, $f_{13}$, and $f_1$ satisfy the following relations (3), (4), and (5):

$$0.19 < f_{11}/f_1 \tag{3};$$

$$f_{12}/f_1 < -0.019 \tag{4};$$

$$0.19 f_{13}/f_1 \tag{5}.$$

2. The reflective eyepiece optical system according to claim 1, wherein a distance along the optical axis between an optical surface of the first optical element distant from the human eye viewing side and the optical reflection surface of the second optical element is $d_1$, a distance along the optical axis between the optical surface of the first optical element distant from the human eye viewing side and an optical surface in the first lens group closest to the human eye viewing side is $d_2$, and $d_1$ and $d_2$ satisfy the following relation (6):

$$0.82\ d_2 d_1 \tag{6}.$$

3. The reflective eyepiece optical system according to claim 1, wherein a maximum effective optical aperture of the second optical element is $\varphi_2$, which satisfies the following relation (7):

$$\varphi_2 < 70\ mm \tag{7}.$$

4. The reflective eyepiece optical system according to claim 1, wherein the effective focal length $f_{11}$ of the first sub-lens group, the effective focal length $f_{12}$ of the second sub-lens group, the effective focal length $f_{13}$ of the third sub-lens group, and the effective focal length $f_1$ of the first lens group further satisfy the following relations (8), (9), and (10):

$$0.78 < f_{11}/f_1 < 1.06 \tag{8};$$

$$-1.16 < f_{12}/f_1 < -0.90 \tag{9};$$

$$1.38\ f_{13}/f_1 < 3.6 \tag{10}.$$

5. The reflective eyepiece optical system according to claim 1, wherein the first sub-lens group is composed of two lenses, which are respectively a first lens distant from the miniature image displayer side and a second lens proximate to the miniature image displayer side; both the first lens and the second lens are positive lenses.

6. The reflective eyepiece optical system according to claim 1, wherein the second sub-lens group is composed of one lens, and the second sub-lens group comprises a third lens adjacent to the first sub-lens group; the third lens is a negative lens; an effective focal length of the third lens is $f_{121}$, and $f_{121}$ satisfies the following relation (12):

$$f_{121} < -5.38 \tag{12}.$$

7. The reflective eyepiece optical system according to claim 1, wherein the third sub-lens group is composed of one lens, and the third sub-lens group comprises a fourth lens adjacent to the second sub-lens group; the fourth lens is a positive lens; an effective focal length of the fourth lens is $f_{131}$, and $f_{131}$ satisfies the following relation (13):

$$8.82 < f_{131} \tag{13}.$$

8. The reflective eyepiece optical system according to claim 1, wherein the first optical element is a planar transflective optical element; a reflectivity of the first optical element is $Re_1$, and $Re_1$ satisfies the following relation (16):

$$20\% < Re_1 < 80\% \tag{16}.$$

9. The reflective eyepiece optical system according to claim 1, wherein the second optical element comprises two coaxial optical surfaces of the same face shape.

10. The reflective eyepiece optical system according to claim 1, wherein a reflectivity of the optical reflection surface is $Re_2$, and $Re_2$ satisfies the following relation (17):

$$20\% < Re_2 \tag{17}.$$

11. The reflective eyepiece optical system according to claim 1, wherein an angle of optical axis between the first lens group and the second optical element is $\lambda_1$, and $\lambda_1$ satisfies the following relation (18):

$$55° < \lambda_1 < 120° \tag{18}.$$

12. The reflective eyepiece optical system according to claim 1, wherein the eyepiece optical system further comprises a planar reflective optical element located between the first lens group and the first optical element; the planar reflective optical element reflects the image light refracted by the first lens group to the first optical element, the first optical element reflects the image light to the second optical element, and then transmits the image light reflected by the second optical element to the human eyes;

an angle of optical axis between the first lens group and the first optical element is $\lambda_2$, and $\lambda_2$ satisfies the following relation (19):

$$60° \leq \lambda_2 \leq 180° \tag{19}.$$

13. The reflective eyepiece optical system according to claim 1, wherein the material of the second optical element is an optical plastic material.

14. A head-mounted near-to-eye display device, comprising a miniature image displayer, and further comprising the reflective eyepiece optical system according to claim 1; wherein the eyepiece optical system is located between the human eyes and the miniature image displayer.

15. The reflective eyepiece optical system according to claim 1, wherein the first sub-lens group is composed of one lens; the first sub-lens group comprises a first lens; and the first lens is a positive lens.

16. The reflective eyepiece optical system according to claim 15, wherein an effective focal length of the first lens is $f_{111}$, the effective focal length of the first sub-lens group is $f_{11}$, and $f_{111}$ and $f_{11}$ satisfy the following relation (11), $$0.10 < |f_{111}/f_{11}| \tag{1}.$$

17. The reflective eyepiece optical system according to claim 15, wherein an optical surface of the first lens proximate to the human eye side is convex to the human eyes.

18. The reflective eyepiece optical system according to claim 1, wherein the fourth sub-lens group is composed of one lens, and the fourth sub-lens group comprises a fifth lens adjacent to the third sub-lens group; an optical surface of the fifth lens proximate to the miniature image displayer side is concave to the miniature image displayer; an effective focal length of the fifth lens is $f_{141}$, and $f_{141}$ satisfies the following relation (14):

$$2.15<|f_{141}/f_1| \tag{14}$$

19. The reflective eyepiece optical system according to claim 18, wherein the fifth lens and the miniature image displayer are movable together along the optical axis, for adjusting an equivalent visual virtual image distance of the eyepiece optical system.

20. The reflective eyepiece optical system according to claim 18, wherein the first lens group comprises one or more even-order aspherical face shapes; two optical surfaces of the fifth lens are both even-order aspherical face shapes; and two optical surfaces of the second optical element are both even-order aspherical face shapes.

* * * * *